United States Patent
Deets, Jr. et al.

(10) Patent No.: US 10,678,401 B2
(45) Date of Patent: *Jun. 9, 2020

(54) PROVIDING GROUP MESSAGING THREAD HIGHLIGHTS

(71) Applicant: WhatsApp Inc., Menlo Park, CA (US)

(72) Inventors: Charles Donald Deets, Jr., Palo Alto, CA (US); Randall Sarafa, San Francisco, CA (US); Anton Borzov, Palo Alto, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,943

(22) Filed: Nov. 6, 2017

(65) Prior Publication Data
US 2019/0138160 A1 May 9, 2019

(51) Int. Cl.
*G06F 3/0482* (2013.01)
*G06F 3/0484* (2013.01)
*H04L 12/58* (2006.01)

(52) U.S. Cl.
CPC ........ *G06F 3/0482* (2013.01); *G06F 3/04847* (2013.01); *H04L 51/043* (2013.01); *H04L 51/10* (2013.01); *H04L 51/12* (2013.01); *H04L 51/16* (2013.01); *H04L 51/32* (2013.01)

(58) Field of Classification Search
CPC ... H04L 12/1813; H04L 51/16; H04L 67/306; H04L 51/32; H04L 67/22; H04L 51/10; H04L 51/12; H04L 51/043; G06F 3/0482; G06F 3/04847
See application file for complete search history.

(56) References Cited

U.S. PATENT DOCUMENTS

| | | |
|---|---|---|
| 8,099,512 B2 | 1/2012 | Katis et al. |
| D684,592 S | 6/2013 | Vonder Haar et al. |
| D686,637 S | 7/2013 | Anzures |
| D714,313 S | 9/2014 | Pereira et al. |
| D720,765 S | 1/2015 | Xie et al. |
| D729,821 S | 5/2015 | Ryan et al. |
| D740,835 S | 10/2015 | Song |

(Continued)

OTHER PUBLICATIONS

U.S. Appl. No. 15/803,950, filed Jan. 11, 2019, Office Action.
(Continued)

*Primary Examiner* — Tan H Tran
(74) *Attorney, Agent, or Firm* — Keller Jolley Preece

(57) ABSTRACT

The present disclosure is directed to systems and methods for identifying and providing highlight messages from a group messaging thread. For example, systems and methods described herein detect when a group messaging thread participant becomes absent from the group messaging thread, and identifies one or more highlight messages that were submitted to the group messaging thread while the participant was absent. Systems and methods described herein identify highlight messages that are specific to the absent participant, such that when the participant again accesses the group messaging thread, the participant can review the identified highlight messages in order to quickly "catch up" on the group messaging thread without having to read each electronic message submitted to the group messaging thread during the participant's absence.

20 Claims, 18 Drawing Sheets

(56) References Cited

U.S. PATENT DOCUMENTS

| | | | |
|---|---|---|---|
| D742,409 S | 11/2015 | Perez et al. | |
| D752,075 S | 3/2016 | Barcheck et al. | |
| D757,106 S | 5/2016 | Patel et al. | |
| D759,723 S | 6/2016 | Butcher et al. | |
| D763,914 S | 8/2016 | Butcher et al. | |
| 9,483,529 B1 | 11/2016 | Pasoi et al. | |
| D775,151 S | 12/2016 | Dellinger et al. | |
| D775,669 S | 1/2017 | Murata et al. | |
| D802,003 S | 11/2017 | Jeon et al. | |
| D803,879 S | 11/2017 | Broughton et al. | |
| D807,907 S | 1/2018 | Dellinger et al. | |
| D808,410 S | 1/2018 | Jin et al. | |
| 9,880,735 B2 | 1/2018 | Dascola et al. | |
| D809,542 S | 2/2018 | Lu | |
| D812,067 S | 3/2018 | Chaudhri et al. | |
| D814,519 S | 4/2018 | Martin et al. | |
| D826,245 S | 8/2018 | Szeto et al. | |
| D835,669 S | 12/2018 | Hong | |
| D839,896 S | 2/2019 | Kuscher et al. | |
| D842,319 S | 3/2019 | Kawaichi et al. | |
| D851,671 S | 6/2019 | Deets et al. | |
| 2009/0144661 A1 | 6/2009 | Nakajima et al. | |
| 2012/0185797 A1* | 7/2012 | Thorsen | G06Q 10/00 715/784 |
| 2013/0111356 A1 | 5/2013 | Vasudevan et al. | |
| 2013/0297604 A1* | 11/2013 | Sutedja | G06Q 10/107 707/737 |
| 2015/0026590 A1* | 1/2015 | Shirzadi | G06F 3/017 715/751 |
| 2015/0248270 A1 | 9/2015 | Lang | |
| 2016/0133052 A1 | 5/2016 | Choi et al. | |
| 2016/0191446 A1 | 6/2016 | Grol-Prokopczyk et al. | |
| 2017/0142055 A1 | 5/2017 | Martinazzi et al. | |
| 2017/0357422 A1 | 12/2017 | Jon et al. | |
| 2018/0095940 A1* | 4/2018 | Meixner | H04L 51/046 |
| 2018/0270183 A1* | 9/2018 | Wei | H04L 51/26 |
| 2018/0287981 A1* | 10/2018 | Leiba | H04L 51/16 |
| 2019/0103982 A1 | 4/2019 | Brunn et al. | |
| 2019/0121866 A1 | 4/2019 | Garg et al. | |
| 2019/0138174 A1 | 5/2019 | Deets et al. | |
| 2019/0138655 A1 | 5/2019 | Deets et al. | |
| 2019/0140993 A1 | 5/2019 | Deets et al. | |

OTHER PUBLICATIONS

U.S. Appl. No. 15/803,956, filed Dec. 13, 2018, Office Action.
U.S. Appl. No. 29/625,978, filed Jan. 22, 2019, Notice of Allowance.
U.S. Appl. No. 15/803,931, filed Jun. 11, 2019, Office Action.
U.S. Appl. No. 15/803,950, filed May 16, 2019, Office Action.
U.S. Appl. No. 15/803,956, filed May 16, 2019, Office Action.
"Introducing Instant Messaging and Chat in the Workspace"—Herbsleb et al, Bell Laboratories, Lucent Technologies & University of Michigan School of Information, Apr. 25, 2002 http://citeseerx.ist.psu.edu/viewdoc/download?doi=10.1.1.137.7681&rep=rep1&type=pdf (Year: 2002).
Magento Icon Library [online], May 5, 2018 {retrieved Oct. 18, 2019], Retrieved from the internet <URL:http// devdocsmagento.corn/guides/v2.3/pattern-library/graphics/iconography/iconography.htra>, Image of Expand icon (Year: 2018).
U.S. Appl. No. 15/803,931, filed Aug. 28, 2019, Notice of Allowance.
U.S. Appl. No. 15/803,950, filed Sep. 30, 2019, Office Action.
U.S. Appl. No. 15/803,956, filed Oct. 1, 2019, Office Action.
U.S. Appl. No. 29/695,242, filed Oct. 24, 2019, Office Action.
U.S. Appl. No. 15/803,950, filed Jan. 23, 2020, Notice of Allowance.
U.S. Appl. No. 15/803,956, filed Feb. 5, 2020, Notice of Allowance.
U.S. Appl. No. 29/695,242, filed Apr. 9, 2020, Office Action.

* cited by examiner

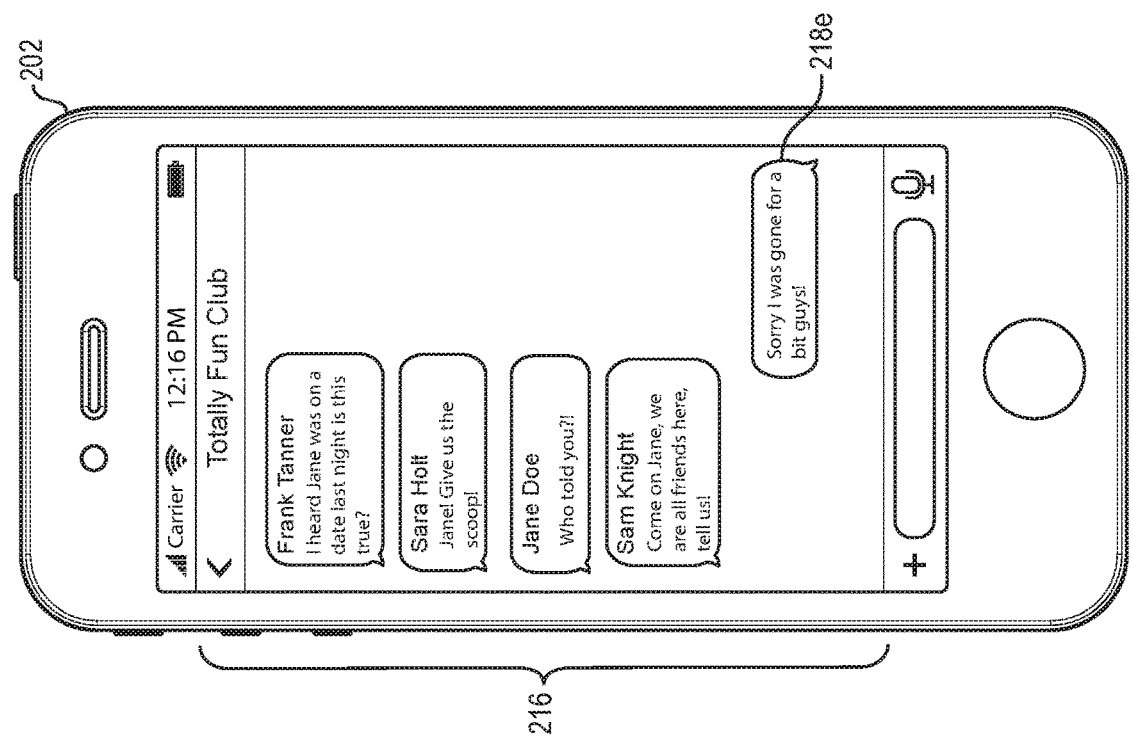

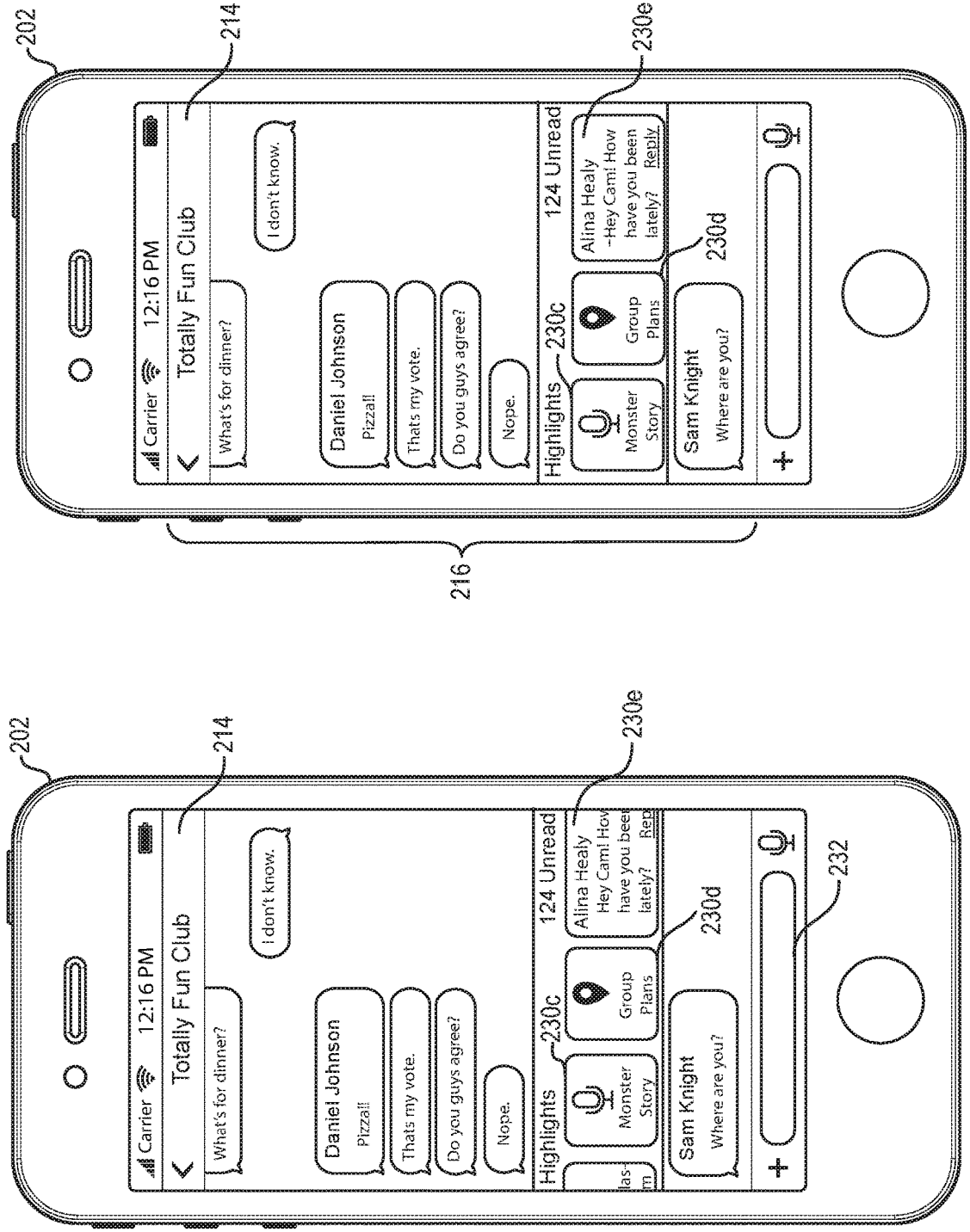

PROVIDING GROUP MESSAGING THREAD HIGHLIGHTS

BACKGROUND

Electronic messaging systems provide the opportunity for groups of users to exchange electronic messages. For example, a group of users can individually submit electronic messages to a group messaging thread, and the electronic messaging system organizes each submitted electronic message chronologically, such that the resulting thread includes electronic messages in the order that they were received. The group messaging thread participants can then read the included electronic messages by, for example, scrolling through the group messaging thread.

A problem arises, however, for a group messaging thread participant who becomes absent from the thread for a period of time. For example, if the participant has been absent from the thread for a period of time (e.g., the participant has been away from their mobile phone or internet access), an overwhelming number of electronic messages may have been submitted to the thread by the other group messaging thread participants. Thus, when the participant again accesses the group messaging thread, the participant is faced with an overwhelming number of electronic messages that he or she must read in order to "catch up" on the thread. This is generally an inconvenient and time-consuming process that can result in the participant becoming disengaged from the group messaging thread.

Group messaging thread participants typically do not spend the time required to catch up on large numbers of missed messages in a group messaging thread. Instead, a group messaging thread participant who has been absent from the thread generally continues on at the thread's current place when he or she next accesses the thread, without any knowledge of the current context of the conversation. Thus, conventional electronic messaging systems are problematic and unable to re-engage participants with a group messaging thread after a period of absence.

Accordingly, a need exists for an improved messaging system that addresses the above disadvantages related to group messaging threads.

SUMMARY

One or more embodiments described herein provide benefits and/or solve one or more of the foregoing or other problems in the art with electronic communication systems. For instance, the present disclosure describes systems, computer-readable media, and methods for updating a group messaging thread participant on group messaging thread activity that occurred during a period of absence from a group messaging thread.

In accordance with one or more disclosed embodiments, an electronic messaging system determines a period of time corresponding to a group messaging participant's absence from a group messaging thread. Based on the determined period of time corresponding to the participant's absence, the system identifies one or more "highlight" messages (e.g., messages likely to be of interest to the participant) from messages added to the group messaging thread during the period of absence. For instance, in some embodiments the system calculates scores for each message added to the group messaging thread during the period of absence and identifies the highlight messages based on the calculated scores. In response to the participant accessing the group messaging thread after the period of absence, the system provides the identified highlight messages to the participant.

As mentioned, the system identifies highlight messages to provide to a participant after a period of absence. In some embodiments, the highlight messages can include one or more of the following: electronic messages within the thread that trigger bursts of conversation, electronic messages that include media or hyperlinks, and electronic messages that include event information. Moreover, in one or more additional or alternative embodiments, the highlight messages can include electronic messages that mention the participant or are otherwise directly related to the participant, such as an electronic message containing a question directed to the participant by someone else while the participant was absent from the thread.

As mentioned, in accordance with one or more embodiments, a system provides one or more highlight messages to a participant in response to the participant accessing a group messaging thread after a period of absence. As disclosed herein, the system can provide the highlight messages to the participant in a number of ways. For example, a disclosed system provides a graphical user interface and corresponding options that enable the participant to flip through identified highlight messages in the group messaging thread, view a listing of the highlight messages, and/or navigate through the group messaging thread by interacting with the highlight messages.

In accordance with the above-mentioned features and the additional features disclosed throughout the description and drawings, the disclosed systems and methods resolve many problems associated with conventional electronic messaging systems. Indeed, the disclosed systems and methods enable an absent group messaging participant to quickly catch up on missed messages and conversations, and re-engage with a group messaging thread after a period of absence from the group messaging thread.

Additional advantages of the present application will be set forth in the description that follows and the appended drawings, and in part will be obvious from the disclosed embodiments, or may be learned by the practice of such embodiments. The features and advantages of such embodiments may be realized and obtained by the instruments and combinations particularly pointed out in the appended claims. These and other features will become more fully apparent from the following description, appended drawings, and appended claims.

BRIEF DESCRIPTION OF THE DRAWINGS

The detailed description refers to the drawings briefly described below.

FIGS. 2A-2E illustrate a series of graphical user interfaces illustrating various features in accordance with one or more embodiments of the electronic communication system;

FIGS. 3A-3E illustrate a series of graphical user interfaces illustrating various features in accordance with one or more embodiments of the electronic communication system;

DETAILED DESCRIPTION

Figure 1:
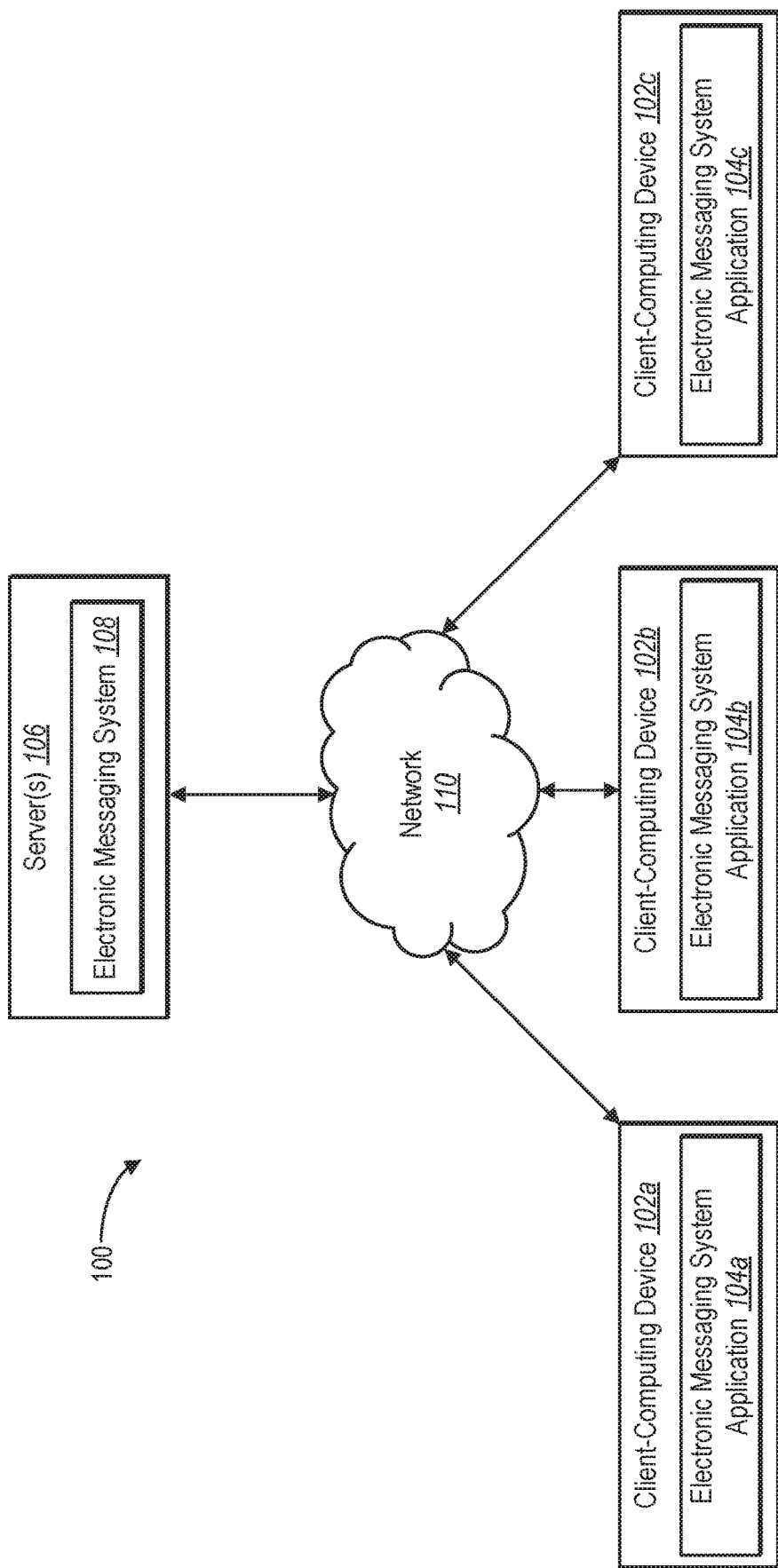
FIG. 1 illustrates an environmental diagram of an electronic communication system in accordance with one or more embodiments.

One or more embodiments of the present disclosure include an improved electronic messaging system, as well as corresponding computer-readable media and methods. For instance, in accordance with one or more embodiments, a disclosed system determines a period of time corresponding to a group messaging thread participant's absence from a group messaging thread. Based on the determined period of absence, the system then identifies electronic messages added to the group messaging thread during the period of absence. In some embodiments, for each of the identified electronic messages, the system calculates a score and then uses the calculated scores to identify highlight messages (e.g., messages likely to be of interest to the participant). After identifying the highlight messages, the system then provides the identified highlight messages to the user when the participant accesses the group messaging thread after the period of absence, as explained in more detail below. In this manner, the system enables the participant to quickly re-engage with the group messaging thread after the period of absence.

The embodiments disclosed herein provide a number of advantages over conventional systems. For example, the disclosed electronic communication system improves group electronic messaging and engagement with group messaging threads by mitigating the disruptions caused by periods of participant absence. Further, by providing highlight messages to the user in intuitive and non-distracting ways, the electronic communication system provides a method by which the participant can quickly catch up on the contents of group messaging thread without sacrificing valuable display space within a graphical user interface. For instance, the electronic communication system enables the participant to easily view highlight messages, navigate to portions of a group messaging thread corresponding to the highlight messages, view messages related to the highlight messages, and consume content related to the highlight messages. The electronic communication system can further customize the experience for each participant so as to increase re-engagement for each participant after a period of absence.

To illustrate one example embodiment, the electronic communication system begins by monitoring a group messaging thread participant's activity within a social networking system as well as within an electronic messaging system. For example, the electronic communication system monitors the participant's activities relative to the social networking system including, but not limited to, the participant's "likes," comments, shares, co-users, and profile information. Additionally, the electronic communication system monitors the participant's activities relative to the electronic messaging system. For example, the electronic communication system monitors the participant's overall activity level with regard to all of the messaging threads in which the participant is included. The electronic communication system also monitors the co-users and topics with which the participant most frequently engages. Finally, the electronic communication system monitors the participant's activity level with regard to a particular group messaging thread. In one or more embodiments, the electronic communication system utilizes this monitored activity information when identifying highlight messages and otherwise customizing an experience for a participant when the participant accesses a group messaging thread after a period of absence.

As used herein, a "group messaging thread" refers to a communication thread that includes three or more participants. For example, a communication thread between two participants would generally not include many electronic messages submitted to the thread by one participant during the other participant's absence. Conversely, a group messaging thread including three of more participants may include entire conversations that occur during one of the participant's absence from the thread.

Also as used herein, a "highlight message" refers to an electronic message selected from a plurality of electronic messages within a group messaging thread that the electronic communication system determines is likely to be of interest to a participant following the participant's period of absence from the group messaging thread. In one or more embodiments, electronic messages within a group messaging thread (e.g., or any communication thread) can include text, media (e.g., digital photographs and/or videos), hyperlinks, and other interactive elements (e.g., check-ins, event information). In at least one embodiment, the electronic communication system determines that an electronic message is a highlight message by analyzing the contents of the electronic message, and determining their potential interest, relative to the participant, as will be explained in more detail below.

Moreover, in one or more embodiments, the electronic communication system utilizes the participant's activity level with regard to the particular group messaging thread to determine whether and when the participant becomes absent from the group messaging thread. For example, in some embodiments the electronic communication system determines that a participant is absent from a group messaging thread for a period of time based on a determination that the participant has not opened or accessed the group messaging thread, that the participant has not read one or more messages within the group messaging thread, that the participant has closed an electronic messaging application on the participant's computing device (e.g., mobile device), that the participant has switched focus from an electronic messaging application to another application on the participant's computing device, that the participant's computing device has powered off, or that the participant has not otherwise engaged with the group messaging thread. For instance, the participant may close the electronic messaging system application on the participant's mobile device, may switch focus to another application on the participant's mobile device, or may turn off the mobile device altogether for a period of time. Moreover, in some embodiments, the electronic messaging system determines that a participant is absent from a group messaging thread when the participant's activity level in relation to the group messaging thread drops below a threshold amount.

In one or more embodiments, during a participant's period of absence from a group messaging thread, the electronic communication system monitors the group messaging thread to identify electronic messages added to the thread by other participants during the period of absence. For example, in a group messaging thread between three or more participants, a thread conversation may continue, even in the absence of one of the participants. Thus, after determining that the participant is absent from the group messaging thread, the electronic communication system identifies the electronic messages added to the thread during the participant's absence by other thread participants.

In anticipation of or when the participant next returns to the group messaging thread (e.g., accesses the group messaging thread via the electronic communication system application on his or her mobile phone or other computing device), the electronic communication system identifies one or more highlight messages among the electronic messages added to the thread during the participant's absence by other thread participants. In one or more embodiments, the electronic communication system determines that an electronic message from the group messaging thread is a highlight message by calculating a score for the electronic message based on the electronic message and information specific to the participant. If the calculated score is higher than a threshold amount, the electronic messaging system determines that the electronic message is indeed a highlight message.

In one or more embodiments, the electronic communication system calculates a score for an electronic message based on several characteristics of the electronic message. For example, the electronic communication system calculates the score for the electronic message based on an analysis of the contents of the electronic message, based on an analysis of surrounding message activity in the group messaging thread, and based on information specific to the participant in relation to the electronic message.

For instance, in one or more embodiments, the electronic communication system performs an analysis of the contents of an electronic message submitted to the group messaging thread during the participant's absence. In at least one embodiment, the electronic communication system analyzes the contents of the electronic message to identify one or more digital media items (e.g., digital photographs, digital videos) in the electronic message. Further, the electronic communication system analyzes any text included in the electronic message to identify a topic in which the participant is likely interested, to identify event information, or to identify a mention of the participant or a mention of another thread participant with whom the participant has a high relationship coefficient. In at least one embodiment, the electronic communication system calculates a higher score for an electronic message with contents including any of the above.

As just mentioned above, the electronic communication system also performs an analysis of surrounding message activity in the group messaging thread. In one or more embodiments, the electronic communication system considers it likely that when an electronic message causes an increase to the rate or quantity of thread activity, the electronic message is a highlight message. Thus, the electronic communication system analyzes submission timestamps for electronic messages in the group messaging thread that lead up to and follow the electronic message being analyzed. For example, the electronic communication system may analyze submission timestamps for the five preceding and five succeeding electronic messages relative to the analysis electronic message. If the electronic communication system identifies a "lull" in the conversation leading up to the analysis electronic message (e.g., the preceding electronic messages have timestamps that are spaced out), and a "flurry" of conversation following the analysis electronic message (e.g., the succeeding electronic messages have timestamps that are close together), the electronic communication system can calculate a higher score for the analysis electronic message or otherwise conclude that the electronic message is a highlight message.

Also mentioned above, the electronic communication system calculates a score for an electronic message based on information specific to the participant in relation to the electronic message. In one or more embodiments, the electronic communication system identifies highlight messages that are specific to a particular participant. For example, a highlight message that is specific to one participant may be an electronic message that includes a mention of that participant. Thus, in one or more embodiments, the electronic communication system would not identify this electronic message as a highlight message for a different participant of the group messaging thread.

Accordingly, the electronic communication system performs an analysis of information specific to a particular participant in relation to an analysis electronic message to calculate a score for the analysis electronic message. In one or more embodiments, the electronic communication system analyzes text included in the electronic message to determine whether the electronic message mentions the participant (e.g., the electronic message's sender tagged the participant in the electronic message), whether the electronic message includes a topic in which the participant is interested (e.g., based on the participant's social networking system activity history, based on the participant's electronic messaging system activity history), or whether the electronic message discusses an event that the participant would likely want to attend (e.g., based on the participant's social networking system activity history, based on the participant's electronic messaging system activity history).

Additionally, the electronic communication system can calculate a score for an electronic message based on a relationship coefficient between the electronic message's sender and the participant. For example, in one or more embodiments, the social networking system calculates a relationship coefficient between two users that represents the strength of the relationship between the two users as evidenced by social networking system activity history shared by both users. To illustrate, two social networking system users may have a high relationship coefficient evidenced by their similar age, their shared educational experience (e.g., they attended the same school at the same time), their shared social activities (e.g., tagging each other in pictures, checking in at the same locations), and the length of their "friendship" via the social networking system. Two different social networking system user may have a low relationship coefficient evidenced by the fact that the only social networking system activity history they share is that they both work for the same company.

In one or more embodiments, the electronic communication system calculates a higher score for an electronic message submitted to the group messaging thread by a sender with whom the participant has a high relationship coefficient. For example, in at least one embodiment, the electronic communication system assumes that the participant would be more interested in reading electronic messages from a close friend. Thus, the electronic communication system is more likely to identify an electronic message from a sender with a high relationship coefficient as a highlight message.

Once the electronic communication system calculates a score for each electronic message submitted to the group messaging thread during the participant's absence, the electronic communication system identifies one or more highlight messages among the scored electronic messages. In one or more embodiments, the electronic communication system determines that electronic messages with a score above a threshold amount are highlight messages. Alternatively, the electronic communication system may determine that a certain number or percentage of top-scoring electronic messages are highlight messages.

In yet further embodiments, the electronic communication system identifies highlight messages based on the satisfaction of one or more criteria, without necessarily calculating scores for the messages. For example, in some embodiments, the electronic communication system determines that an electronic message is a highlight message because the message includes a reference to the participant, includes a digital image, sparks a flurry of conversation, is from a close friend of the participant, or includes any other characteristic determined to be of particular interest to the participant, such as any of the characteristics mentioned above. Accordingly, the electronic communication system need not base the identification of highlight messages on calculated scores of the highlight messages, as described above. Rather, the electronic communication system can additionally or alternatively identify highlight messages based on any criteria indicating a likelihood of interest by the user in the message.

After identifying one or more highlight messages corresponding to the participant's absence from the group messaging thread, the electronic communication system provides the highlight messages to the participant in one of various ways. For example, the electronic communication system can enable the participant to simply "flip" from one highlight message to the next within the group messaging thread. Alternatively, the electronic communication system can compile excerpts of the identified highlight messages, and provide the highlight excerpts in connection with the group messaging thread. Thus, the participant can quickly and easily review the highlight excerpts in order to get caught up with the thread and/or jump to certain positions within the thread to answer a question, to view a photograph, or to read an interesting exchange.

FIG. 1 illustrates an example block diagram of an environment for implementing an electronic communication system 100. As illustrated in FIG. 1, the electronic communication system 100 includes server(s) 106, on which an electronic messaging system 108 operates. Further shown in FIG. 1, the electronic communication system 100 includes the client-computing devices 102a, 102b, and 102c. Each of the client-computing devices 102a, 102b, and 102c include an electronic messaging system application 104a, 104b, and 104c, respectively.

The server(s) 106 and the client-computing devices 102a, 102b, and 102c communicate via the network 110, which may include one or more networks and may use one or more communication platforms or technologies suitable for transmitting data and/or communication signals. In one or more embodiments, the network 110 includes the Internet or World Wide Web. The network 110, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

Although FIG. 1 illustrates a particular arrangement of the server(s) 106, the client-computing devices 102a, 102b, and 102c, and the network 110 various additional arrangements are possible. For example, the client-computing devices 102a, 102b, and 102c may directly communicate with the server(s) 106, bypassing the network 110. Additional details relating to the network 110 are explained below with reference to FIG. 11.

As shown in FIG. 1, the client-computing devices 102a, 102b, 102c include the electronic messaging system application 104a, 104b, 104c, respectively. In at least one embodiment, the electronic messaging system application 104a, 104b, 104c organizes electronic messages exchanged between the users of the electronic messaging system 108 into communication threads, where each thread includes a chronological ordering of electronic messages, as well as additional indicators as to who authored an electronic message and whether the electronic message has been delivered and/or read.

As illustrated, in one or more embodiments, the server(s) 106 can include all, or a portion of, the electronic messaging system 108. In particular, the electronic communication system 100 can comprise an application running on the server(s) 106 or a portion of a software application that can be downloaded from the server(s) 106. For example, the electronic messaging system 108 can include a web hosting application that allows one or more of the client-computing devices 102a, 102b, and 102c to interact with content hosted at the server(s) 106. To illustrate, in one or more embodiments of the electronic communication system 100, the client-computing device 102a communicates with the server (s) 106 to send and receive electronic messages for a user of the client-computing device 102a. In particular, the client-computing device 102a can run an application to allow a user to compose, access, view, and/or interact with electronic messages and messaging threads facilitated by the server(s) 106 and electronic messaging system 108.

Although FIG. 1 illustrates a particular arrangement of the client-computing devices 102a, 102b, and 102c, the network 110, and the server(s) 106, various additional arrangements are possible. For example, while FIG. 1 illustrates the client-computing devices 102a, 102b, and 102c communication with the server(s) 106 via the network 110, in one or more embodiments, additional client-computing devices can also communicate with the server(s) 106 via the network 110, or directly.

Similarly, although FIG. 1 illustrates various components, the electronic communication system 100 may have additional or alternative components. For example, the electronic communication system 100 can be implemented on a single computing device. In particular, the electronic communication system 100 may be implemented in whole by one of the client-computing devices 102a, 102b, or 102c, or the electronic communication system 100 may be implemented in whole by the server(s) 106. Alternatively, the electronic communication system 100 may be implemented across multiple devices or components (e.g., utilizing multiple client-computing devices and the server(s) 106).

As discussed above, the systems and methods laid out with reference to FIG. 1 receive electronic messages, organize the electronic messages into a messaging thread, and identify one or more highlight messages submitted to the communication thread during a user's absence. By way of example, in one or more embodiments, the users of the client-computing devices 102a, 102b, and 102c utilize the electronic messaging system applications 104a, 104b, and 104c, respectively to submit electronic messages to a group messaging thread. The electronic messaging system 108 organizes the submitted electronic messages chronologically in the group messaging thread, and the users of the client-computing devices 102a, 102b, and 102c utilize the electronic messaging system applications 104a, 104b, and 104c, respectively to view the organized group messaging thread.

In one or more embodiments, when the user of the client-computing device 102a becomes inactive for a threshold period of time, the electronic communication system 100 determines that the user of the client-computing device 102a is absent from the group messaging thread. During this user's period of absence, the other users of the client-computing device 102b and the client-computing device 102c may continue to add electronic messages to the group messaging thread. Thus, when the user of the client-computing device 102a again accesses the group messaging thread via the electronic messaging system application 104a, the electronic communication system 100 identifies one or more highlight messages among the electronic messages added by the users of the client-computing devices 102b, 102c during the period of absence associated with the user of the client-computing device 102a. The electronic communication system 100 can present the identified highlight messages to the user of the client-computing device 102a via the electronic messaging system application 104a in a variety of ways, as will be discussed below with reference to FIGS. 2A-4F.

For example, the electronic communication system 100 can provide, alone and/or in combination with other components, one or more graphical user interfaces ("GUIs" or "interfaces") in performing its functions. For instance, the electronic communication system 100 can utilize the electronic messaging system application 104a, 104b, 104c to provide GUIs with interface elements that allow the group messaging thread participants to interact with the electronic messaging system 108. To illustrate, FIGS. 2A-4F and the description that follows illustrate various example embodiments of GUIs and features in accordance with one or more embodiments of the electronic communication system 100.

Figure 2B:
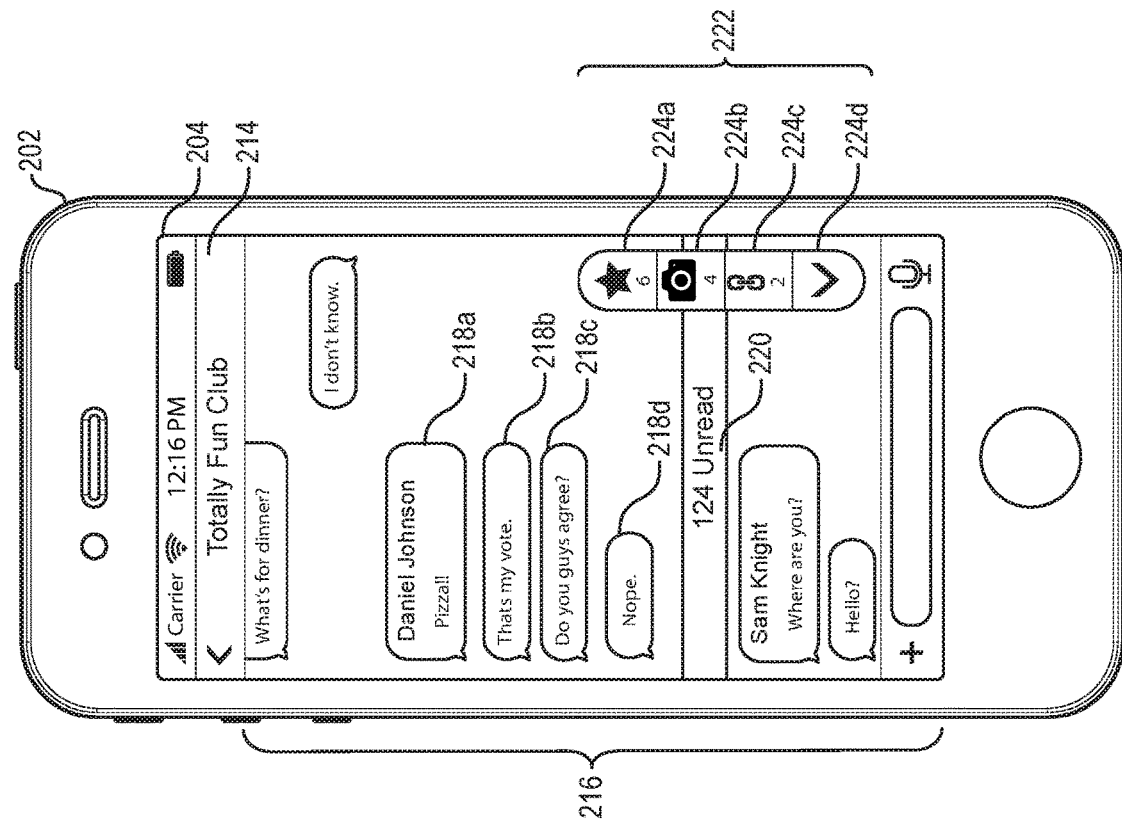
Figure 2A:
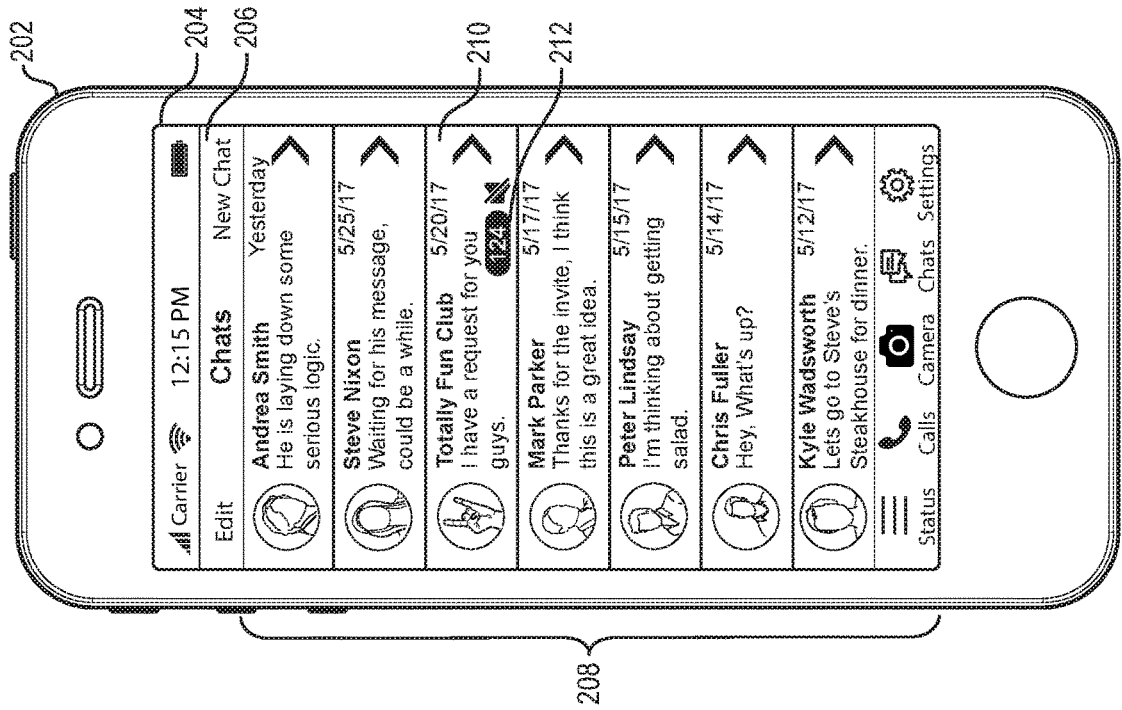

For example, FIG. 2A illustrates a client-computing device 202 (e.g., as an example of the client-computing device 102a shown in FIG. 1) that may implement one or more of the components or features of the electronic communication system 100. As shown, the client-computing device 202 is a handheld device, such as a mobile phone device (e.g., a smartphone). As used herein, the term "handheld device" refers to a device sized and configured to be held/operated in a single hand of a user. In additional or alternative examples, however, the client-computing device 202 may be any other suitable computing device, such as, but not limited to, a tablet device, a larger wireless device, a laptop or desktop computer, a personal digital assistant device, a wearable computing device (e.g., a head-mounted computing device), and/or any other suitable computing device.

As illustrated in FIG. 2A, the client-computing device 202 includes a touch screen display 204 that can display GUIs and receive and/or detect user input. As used herein, a "touch screen display" refers to the display of a touch screen device (e.g., the client-computing device 202). In one or more embodiments, a touch screen device may be any computing device with at least one surface upon which a user may perform touch gestures (e.g., a laptop, a tablet computer, a personal digital assistant, a media player, a mobile phone). Additionally or alternatively, the client-computing device 202 may include any other suitable input device, such as a touch pad or those described below with reference to FIG. 10.

In FIG. 2A, the touch screen display 204 displays a thread listing GUI 206 provided by an electronic messaging system application (e.g., electronic messaging system application 104a). As shown, the thread listing GUI 206 includes a messaging thread list 208 indicating one or more messaging threads in which the user of the client-computing device 202 is a participant. For example, as shown in FIG. 2A, the messaging thread control 210 indicates that the user of the client-computing device 202 is a participant in the messaging thread entitled "Totally Fun Club." In one or more embodiments, the messaging thread control 210 also includes additional information such as the date the user of the client-computing device 202 last accesses the messaging thread associated with the messaging thread control 210, a profile picture associated with the messaging thread, part or all of a last electronic message accessed by the user of the client-computing device 202 within the associated messaging thread, and an indication of whether notifications associated with the messaging thread have been muted.

As also shown in FIG. 2A, the messaging thread control 210 can include a missed messages indicator 212. In one or more embodiments, in response to determining that the user of the client-computing device 202 has not accessed or has otherwise been absent from a particular messaging thread, the electronic communication system 100 identifies electronic messages submitted to the messaging thread in the user's absence. Thus, the messaging thread control 210 indicates that since the user of the client-computing device 202 was last active in the "Totally Fun Club" messaging thread, one hundred and twenty-four electronic messages have been added to that messaging thread by other participants.

In response to a detected selection of the messaging thread control 210, the messaging application provides the messaging thread GUI 214 on the touch screen display 204 of the client-computing device 202, as shown in FIG. 2B. In one or more embodiments, the electronic communication system 100 (via the messaging application) includes the one or more electronic messages included in the messaging thread in the messaging thread GUI 214. For example, as shown in FIG. 2B, the electronic communication system 100 organizes the one or more electronic messages into the group messaging thread 216. As discussed above, the electronic communication system 100 organizes the one or more electronic messages in the group messaging thread 216 chronologically in the order each electronic message is received by the electronic communication system 100.

In one or more embodiments, the electronic messages 218a, 218b, 218c, and 218d are the last electronic messages in the group messaging thread 216 read by the user of the client-computing device 202 the last time the user accessed the group messaging thread 216. As discussed above, the electronic communication system 100 monitors a group messaging thread participant's activity level relative to a group messaging thread 216 (e.g., by monitoring each time the participant opens the group messaging thread 216). When the participant is absent from the group messaging thread 216 (e.g., doesn't open, access, or otherwise interact with the group messaging thread 216), the electronic communication system 100 monitors the group messaging thread to, for example, identify the electronic messages added to the group messaging thread 216 during the participant's absence.

When the user of the client-computing device 202 (e.g., the absent participant) next accesses the group messaging thread 216, the electronic communication system 100 provides (via the messaging application on the client-computing device 202) a last read position bar 220, as shown in FIG. 2B. In one or more embodiments, the messaging application displays the last read position bar 220 directly adjacent to the last electronic message (e.g., the electronic message 218d) read by the user of the client-computing device 202. As also shown in FIG. 2B, in at least one embodiment, the messaging application displays (e.g., in the last read position bar 220) the number of electronic messages that have been added to the group messaging thread 216 during the user's period of absence. In one or more embodiments, once the user of the client-computing device 202 scrolls down through the group messaging thread 216 to view the unread messages, the messaging application removes the last read position bar 220. Alternatively, the messaging application can reposition the last read position bar 220 as the user scrolls down through the group messaging thread 216, and update the displayed number of unread messages in the last read position bar 220, until the user scrolls all the way to the bottom (e.g., the most recently submitted electronic message) of the group messaging thread 216, after which the last read position bar 220 is removed.

As discussed above, after a period of absence, the electronic communication system 100 identifies highlight messages from among the electronic messages added during the user's absence from the group messaging thread 216. In one or more embodiments, the electronic communication system 100 provides the identified highlight messages in a variety of ways. For example, in the embodiment illustrated in FIG. 2B, the messaging application provides a highlight message control 222 including selectable options for accessing the identified highlight messages. For instance, as shown in FIG. 2B, the highlight message control 222 includes buttons 224a, 224b, 224c, and 224d. In response to a detected selection of one of the buttons 224a-224d, the messaging application navigates within the group messaging thread 216 to different display positions corresponding to the highlight messages.

In some embodiments, each of buttons 224a, 224b, 224c corresponds to a different category of highlight message and is selectable to navigate to highlight messages within the corresponding category. As further shown, each of the buttons 224a-224c includes a number indicating the number of highlight messages identified for each category of highlight message. By interacting with each of the buttons 224a-224c, the user can navigate to and view the corresponding highlight messages pertaining to that button.

For example, in response to the detected selection of the button 224a in the highlight message control 222, the messaging application navigates within the group messaging thread 216 to a position corresponding to a first identified highlight message corresponding to the category of highlight messages represented by button 224a. In one or more embodiments, in response to each additional selection of the button 224a, the messaging application navigates to the display position for the subsequent highlight message corresponding to the button 224a (e.g., until the user has viewed all of the highlight messages corresponding to button 224a).

For instance, in response to the repeated selection of the button 224a, the messaging application can navigate chronologically through the identified highlight messages. Alternatively, in response to the repeated selection of the button 224a, the messaging application can navigate through the identified highlight messages based on each highlight message's score or rank, as will be described further below. This provides the user of the client-computing device 202 with a quick and easy way to review the six identified highlight messages in order to get caught up on the group messaging thread 216, rather than having to read through all of the one hundred twenty-four electronic messages that the user missed during the user's period of absence.

In some embodiments, as discussed above, the electronic communication system 100 identifies highlight messages by calculating a score for each electronic message submitted to the group messaging thread 216 during the period of absence associated with the user of the client-computing device 202. For example, the electronic communication system 100 calculates a score for each of the one hundred and twenty-four electronic messages based on various characteristics. In one or more embodiments, for each electronic message added to the group messaging thread 216 during the user's absence, the electronic communication system 100 calculates the score for the electronic message based on an analysis of the contents of the electronic message, based on an analysis of electronic message activity surrounding the electronic message, and/or based on information specific to the user of the client-computing device 202.

To illustrate, the electronic communication system 100 analyzes the contents of an electronic message to identify one or more of digital media items, text, hyperlinks, interactive elements (e.g., mentions, tags, check-ins), or other metadata associated with the electronic message. In one or more embodiments, the electronic communication system 100 calculates a higher score for an electronic message that contains certain elements. For example, electronic communication system 100 can calculate a higher score for an electronic message that includes a digital image because users tend to be more interested in messages that include images. In another example, the electronic communication system 100 can calculate a higher score for an electronic message with text that includes keywords indicating event plans (e.g., a date and time, a location, words such as "plan"). In yet another example, the electronic communication system 100 can calculate a higher score for an electronic message with text that includes or mentions the name of the user of the client-computing device 202 (e.g., indicating that the electronic message is directed to the user of the client-computing device 202). Alternatively, the electronic messaging system 100 can identify each of the foregoing types of messages as highlight messages independent of any score calculations.

Furthermore, in some embodiments the electronic communication system 100 analyzes electronic message activity surrounding an electronic message and calculates a score accordingly. For instance, if an electronic message causes an increase in a rate of messaging, an increase in a quantity of messages, or an increase to the length of messages added to the group messaging thread after the electronic message, the electronic communication system 100 may calculate a higher score for the electronic message. For example, the electronic communication system 100 determines whether an electronic message causes an increase in a rate of messaging by analyzing timestamps associated with the electronic message and other surrounding (e.g., preceding and succeeding) electronic messages. If the messaging activity (e.g., messages submitted per minute) prior to the electronic message is low, but increases after the electronic message, the electronic communication system 100 can determine that the electronic message caused an increase in the rate of messaging. Further, if the messages submitted prior to the electronic message are short, but become lengthy following the electronic message, the electronic communication system 100 can determine that the electronic message caused an increase to the length of messages in the group messaging thread 216. Based on the determined increase in rate, quantity, length, and/or quality of messaging after the analyzed electronic message, the electronic communication system 100 may determine that the electronic message is a highlight message.

In additional or alternative embodiments, the electronic communication system 100 analyzes and utilizes information specific to the user of the client-computing device 202 when calculating a score for an electronic message. To illustrate, the electronic communication system 100 can access social networking system information related to the user of the client-computing device 202. Based on the social networking system information, the electronic communication system 100 can identify a relationship coefficient between the user of the client-computing device 202 and the sender of the electronic message. In at least one embodiment, the electronic communication system 100 calculates a higher score for the electronic message if the relationship coefficient between the user of the client-computing device 202 and the sender of the electronic message is also high.

After the electronic communication system 100 calculates a score for each electronic message submitted during the period of absence corresponding to the user of the client-computing device 202, the electronic communication system 100 identifies one or more highlight messages. For example, in one embodiment, the electronic communication system 100 identifies a top percentage of scored electronic messages as highlight messages (e.g., the top ten percent of scored messages). Alternatively, the electronic communication system 100 may identify a top number of scored electronic messages as highlight messages (e.g., the ten scored messages with the highest scores). In yet further embodiments, the electronic communication system 100 identifies electronic messages having a particular characteristic (e.g., includes a digital image, mentions the user, includes event information, or causes an increase in messaging activity) as highlight messages.

In a further embodiment, the electronic communication system 100 can "learn" the user's preferences with regard to highlight messages. For example, the electronic communication system 100 can determine, in response to the user of the client-computing device 202 frequently interacting with or viewing highlight messages, that the threshold score for identifying a highlight message can be lowered (e.g., thus enabling more electronic messages to qualify as highlight messages). Conversely, the electronic communication system 100 can determine, in response to the user of the client-computing device 202 rarely interacting with or viewing highlight messages, that the threshold score for identifying a highlight message should be raised (e.g., thus making it harder for an electronic message to qualify as a highlight message). In yet further embodiments, if the user interacts with highlight messages of a particular type or having a particular characteristic more than others, the electronic communication system 100 can alter its heuristics or scoring to provide more highlight messages having the particular type or characteristic to the user in the future.

After identifying one or more highlight messages among the electronic messages submitting during the period of absence associated with the user of the client-computing device 202, the electronic communication system 100 can further rank the identified highlight messages. For example, in one or more embodiments, the electronic communication system 100 ranks the identified highlight messages based on an electronic messaging system activity history associated with the user of the client-computing device 202. For example, the user of the client-computing device 202 may have an activity history associated with the electronic messaging system 108 of only viewing highlight messages that include a digital media item (e.g., an image). Accordingly, the electronic communication system 100 may rank highlight messages containing digital media items higher than highlight messages that only include text.

Additionally or alternatively, the electronic communication system 100 may rank the identified highlight messages based on a social networking system activity history. For example, in at least one embodiment, the electronic communication system 100 can access social networking system information to analyze activity history associated with the user of the client-computing device 202. From this activity history, the electronic communication system 100 can determine information associated with the user of the client-computing device 202 including, but not limited to, the user's interests, hobbies, and demographic information. The electronic communication system 100 can further rank highlight messages based on this information.

In at least one embodiment, the electronic communication system 100 further categorizes each identified highlight message based on the contents of the identified highlight message. For example, the electronic communication system 100 can associate each identified highlight message with at least one of several categories including, but not limited to: digital media, hyperlink, recording, event, mention, or interests. For instance, the electronic communication system 100 may associate a highlight message containing a digital photograph or video with the digital media category, a highlight message containing a hyperlink with the hyperlink category, a recording with the recording category, event information with the event category, a mention of the user of the client-computing device 202 with the mention category, or one or more keywords flagged as interests associated with the user of the client-computing device 202 with the interests category.

Thus, returning again to FIG. 2B, in at least one embodiment, the electronic communication system 100 provides the buttons 224b and 224c in order to enable the user to quickly navigate among various categories of highlight messages. For example, as described above, in response to the repeated selection of the button 224a in the highlight message control 222, the electronic communication system 100 navigates to each identified highlight message. Put another way, the electronic communication system 100 identifies a group message thread identifier associated with each identified highlight message and navigates within the group message thread to the identifier. In one or more embodiments, in response to the repeated selection of the button 224b, the electronic communication system 100 navigates through each identified highlight message in the digital media category. Similarly, in response to the repeated selection of the button 224c, the electronic communication system 100 navigates through each identified highlight message in the hyperlink category.

In at least one embodiment, the electronic communication system 100 provides category buttons (e.g., the buttons 224b and 224c) in the highlight message control 222 based on preferences and/or use history of the user of the client-computing device 202. For example, the electronic communication system 100 can monitor the interactions of the user of the client-computing device 202 with the highlight message control 222. Over time, the electronic communication system 100 may not provide buttons for categories with which the user infrequently interacts. For example, if the user of the client-computing device 202 only interacts with the button 224a and the button 224b after twenty times accessing the highlight message control 222, the electronic communication system 100 may not provide the button 224c the next time the user accesses the group messaging thread 216. In another embodiment, the electronic communication system 100 may monitor the categories of highlight message with which the user spends the most time (e.g., by tracking scroll speed, eye movement). In that embodiment, the electronic communication system 100 may provide buttons for the categories identified as being most interesting to the user of the client-computing device 202.

As mentioned above, in response to a detected selection of one of the buttons 224a-224d in the highlight message control 222, the messaging application navigates the group messaging thread 216 to a display position corresponding with a highlight message. For example, in response to detecting the selection of the button 224b, the messaging application navigates within the group messaging thread 216 to a display position corresponding to the highlight message 226a within the group messaging thread 216, as shown in FIG. 2C. As discussed above, the highlight message 226a may be the highest scoring highlight message in the digital media category, or may be chronologically the first highlight message in the digital media category within the group messaging thread 216.

In one or more embodiments, the messaging application updates the buttons 224a-224d in the highlight message control 222 in response to the detected selection of one or more of the buttons 224a-224d. For example, as shown in FIG. 2C, in response to navigating to the display position corresponding to the highlight message 226a, the messaging application updates the buttons 224a and 224b to reflect that there are now five total highlight messages and three digital media highlight messages remaining that the user of the client-computing device 202 has not seen or otherwise accessed. Additionally or alternatively, the messaging application can also update the buttons 224a-224d in response to detecting the user of the client-computing device 202 simply scrolling down through the group messaging thread 216. For example, as the user scrolls past each highlight message in the group messaging thread 216, the messaging application can update the buttons 224a-224d accordingly.

Figure 2D:
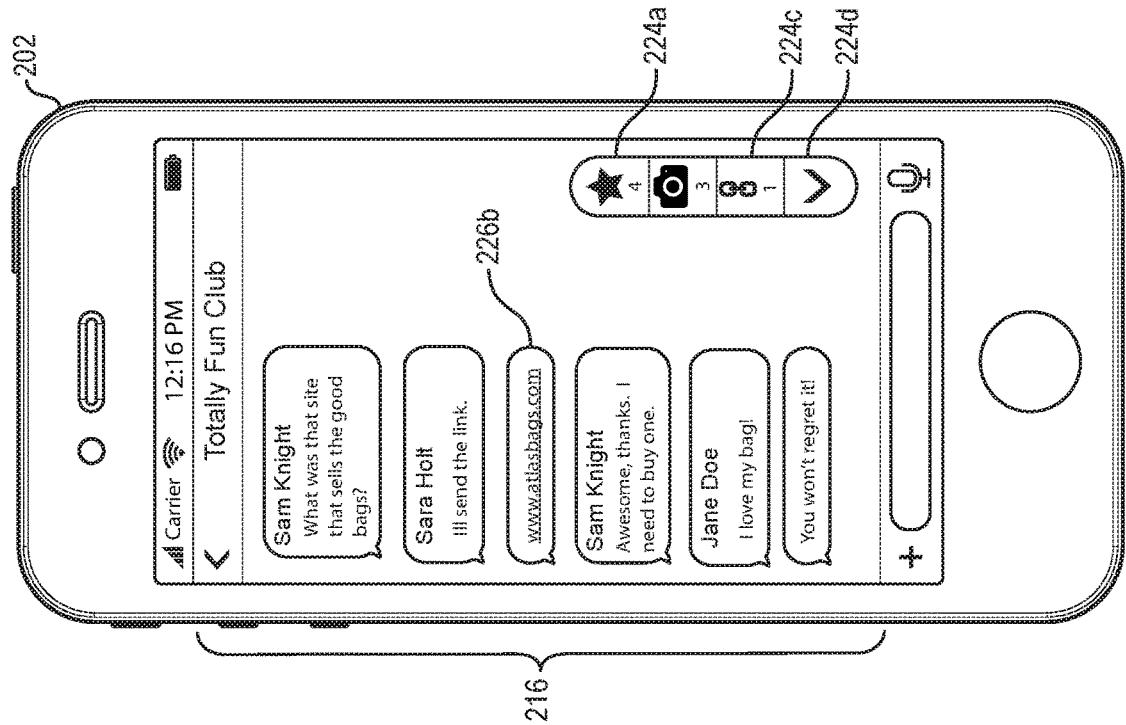
Figure 2C:
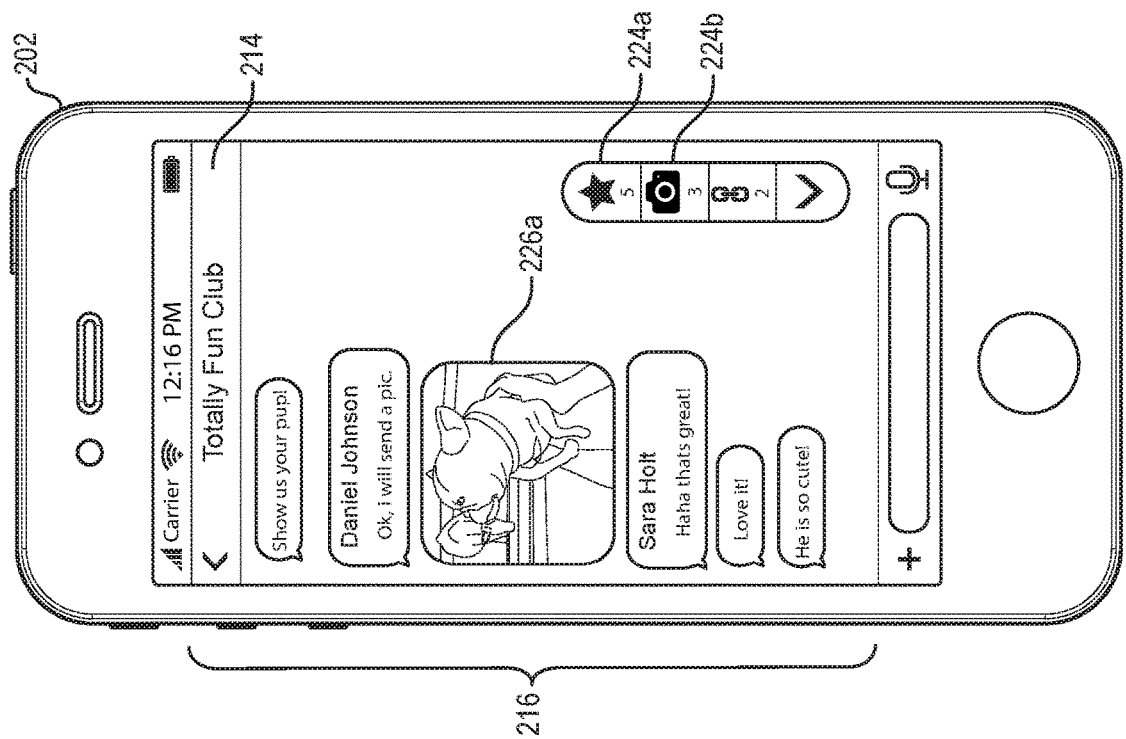

FIG. 2D further illustrates this navigation process. For example, in response to the detected selection of the button 224c (e.g., the hyperlink category of highlight messages), the messaging application navigates to a display position associated with the highlight message 226b. As described above, the messaging application updates the buttons 224a-224d to reflect that one less highlight message exists that the user of the client-computing device 202 has not seen.

At any time, the messaging application can navigate to the bottom (e.g., the most recent portion) of the group messaging thread 216. For example, in response to a detected selection of the button 224d in the highlight message control 222, the messaging application navigates to a display position corresponding to the most recent electronic message added to the group messaging thread 216, as shown in FIG. 2E. At that point, the messaging application may remove the highlight message control 222 from the GUI as shown in FIG. 2E.

The embodiments shown in FIGS. 2A-2E illustrate how the electronic communication system 100 can identify and provide highlight messages to the user of the client-computing device 202 via the highlight message control 222. In additional or alternative embodiments, the electronic communication system 100 can provide identified highlight messages in other ways. For example, as will be described with reference to FIGS. 3A-3E, the electronic communication system 100 can provide identified highlight messages via a horizontally scrollable display.

Figure 3B:
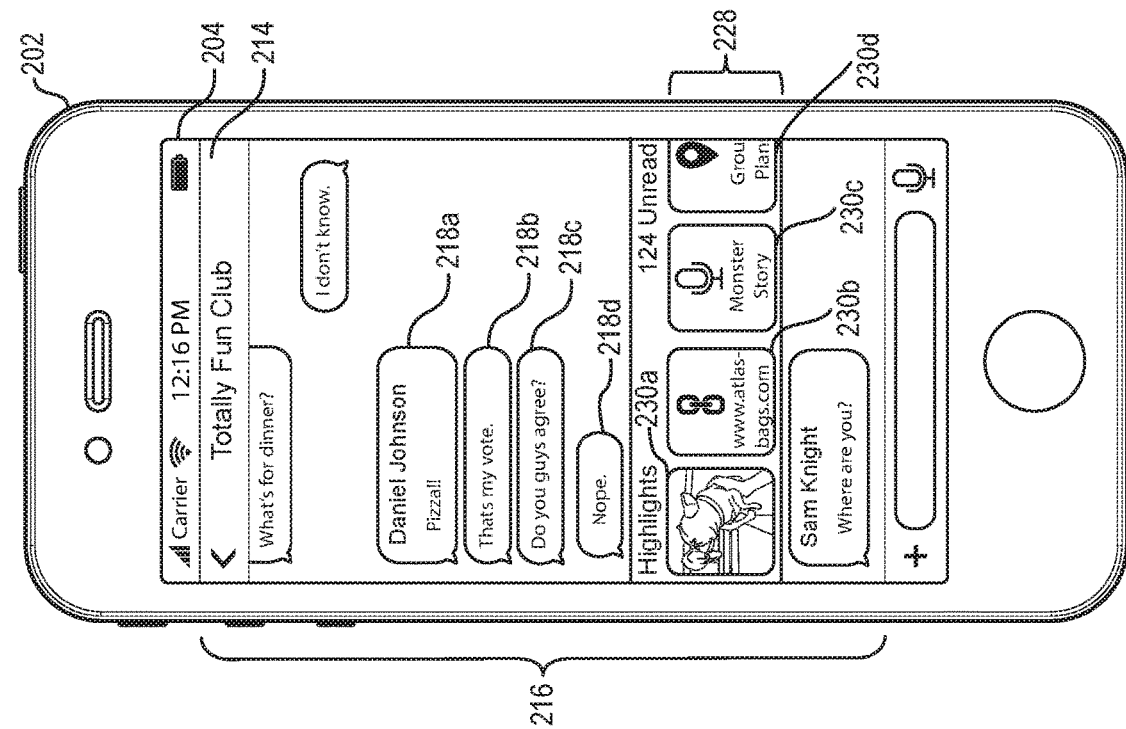
Figure 3A:
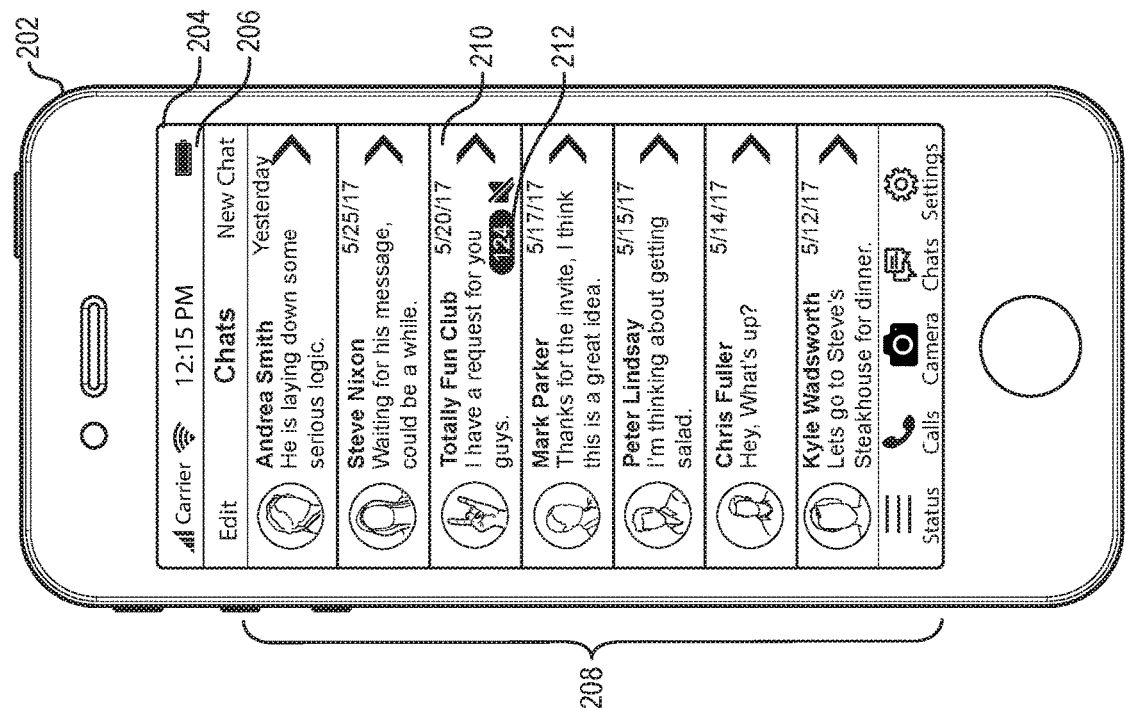

For instance, FIG. 3A illustrates the messaging thread list 208 in the thread listing GUI 206 provided by the messaging application on the touch screen display 204 of the client-computing device 202. As described with reference to FIG. 2A, in FIG. 3A and in response to a detected selection of the messaging thread control 210 including the missed messages indicator 212, the messaging application provides the messaging thread GUI 214 on the touch screen display 204 of the client-computing device 202. Similar to FIG. 2B, the messaging thread GUI 214 in FIG. 3B displays the group messaging thread 216 including electronic messages (e.g., the electronic messages 218a-218d) exchanged between the participants in the group messaging thread 216.

Further illustrated in FIG. 3B, in one or more embodiments, the electronic communication system 100 provides the horizontal scroll display 228 directly adjacent to the last electronic message read by the user of the client-computing device 202 (e.g., the electronic message 218d). As described above with reference to FIG. 2B, the electronic communication system 100 determines when the user of the client-computing device 202 is absent from the group messaging thread 216 and identifies one or more highlight messages from electronic messages submitted to the group messaging thread 216 by other group messaging thread participants during the period of absence.

As shown in FIG. 3B, the messaging application displays, within the group messaging thread 216, a horizontal scroll display 228 including the highlight excerpts 230a-230d. For example, in order to save space and reduce visual clutter within the messaging thread GUI 214, the messaging application does not include the full contents of each identified highlight message in the horizontal scroll display 228. Instead, after identifying one or more highlight messages among the electronic messages submitted to the group messaging thread 216 during the user's period of absence, the messaging application generates a highlight excerpt associated with each identified highlight message (e.g., a thumbnail of a digital image from a highlight message, a portion of the text from a highlight message).

In one or more embodiments, the electronic communication system 100 generates a highlight excerpt associated with a highlight message by analyzing the contents of the highlight message and extracting the most relevant portions of the highlight message to include in the associated highlight excerpt. For example, in at least one embodiment, the electronic communication system 100 utilizes a category associated with the highlight message to identify relevant portions of the highlight message. To illustrate, if the highlight message includes a digital image, the electronic communication system 100 will identify the digital image and generate a thumbnail for the digital image. In another example, if the highlight message is categorized as an event highlight message, the electronic communication system 100 will generate an excerpt to include the event information (e.g., a date, time, location). Thus, as shown in FIG. 3B, the electronic communication system 100 generates the highlight excerpt 230a based on a digital image included in the highlight message, the highlight excerpt 230b based on a hyperlink included in the highlight message, the highlight excerpt 230c based on an audio recording from the highlight message, the highlight excerpt 230d based on event information from the highlight message, and the highlight excerpt 230e (e.g., shown in FIG. 3C) based on a mention of the user in the highlight message.

In one or more embodiments, the electronic communication system 100 can include any number of highlight excerpts in the horizontal scroll display 228. In response to detecting a swipe touch gesture (e.g., or another similar input), the messaging application can scroll through the horizontal scroll display 228 in order to display additional highlight excerpts. For example, as shown in FIG. 3C, in response to detecting a swipe-left touch gesture in association with the horizontal scroll display 228, the messaging application displays an additional highlight excerpt (e.g., the highlight excerpt 230e) while removing the highlight excerpts 230a and 230b from display within the horizontal scroll display 228.

In some embodiments, the highlight excerpts are interactive and/or selectable. For example, in response to a detected selection of the highlight excerpt 230c for a highlight message including an audio recording, the electronic messaging application provides an audio playback control overlaid on the messaging thread GUI 214 to allow the user to listen to the audio recording from the highlight message.

Further, as shown in FIG. 3D, the highlight excerpt 230e is associated with a mention highlight message, where another participant in the group messaging thread 216 has directed a question at or otherwise mentioned the user of the client-computing device 202. As shown, the highlight excerpt 230e includes a selectable "Reply" hyperlink. In response to a detected selection of the "Reply" hyperlink, the messaging application can auto-populate the text box 236 with a mention of the sender of the highlight message associated with the highlight excerpt 230e (e.g., "Alina Healy"). The user of the client-computing device 202 can use the auto-populated message to compose an electronic message in response to sender of the highlight message.

Figure 3E:
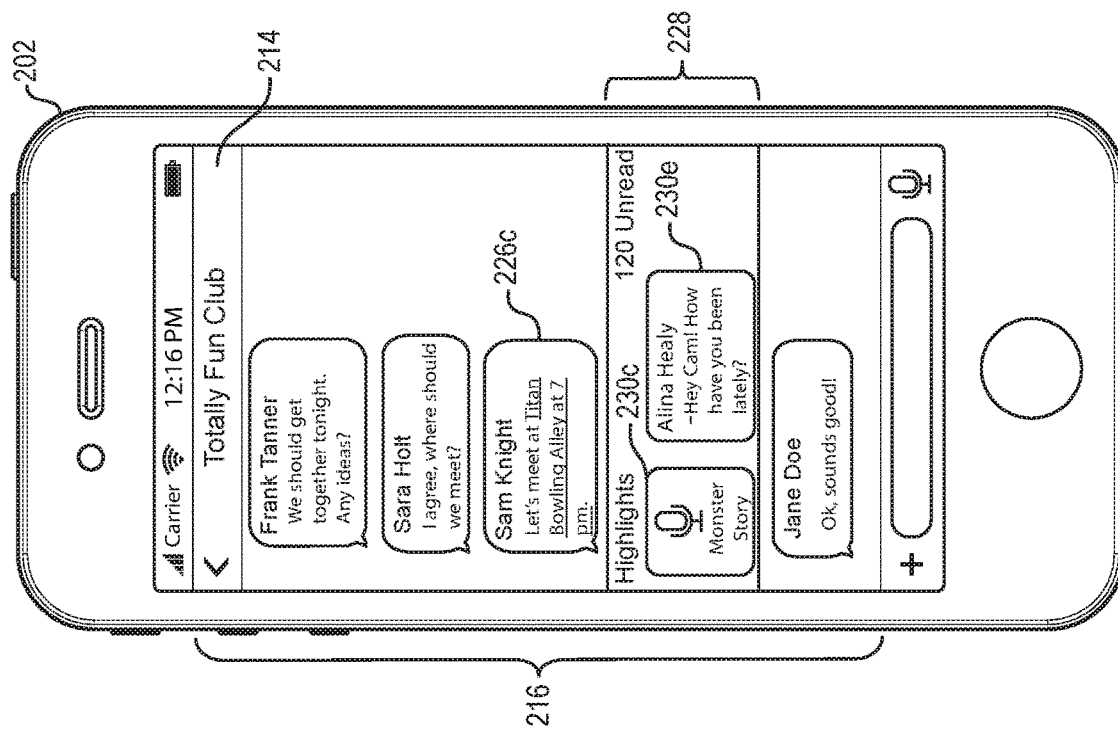

In response to detecting a selection of any of the highlight excerpts 230a-230e, the messaging application can navigate within the group messaging thread 216 to a display position associated with the highlight message that corresponds with the selected highlight excerpt. For example, in response to a detected selection of the highlight excerpt 230d in FIG. 3D, the messaging application navigates within the group messaging thread 216 to a display position associated with the highlight message 226c, as shown in FIG. 3E. As shown, the messaging application vertically centers the highlight message 226c in the messaging thread GUI 214, such that the highlight message 226c may be easily read. Further, in one or more embodiments, the messaging application repositions the horizontal scroll display 228 immediately adjacent to the highlight message 226c, and removes the highlight excerpt 230d from the horizontal scroll display 228 (e.g., indicating that the corresponding highlight message is no longer unread).

Also illustrated in FIG. 3E, in response to navigating the group messaging thread 216 to the highlight message 226c, the messaging application can also update the number of unread messages displayed in the horizontal scroll display 228. For example, in one or more embodiments, because the messaging application navigates directly to the highlight message 226c, the system assumes that the user of the client-computing device 202 does not read any intervening electronic messages in the group messaging thread 216 between the user's previous display position and the current display position. Thus, the messaging application updates the number of unread messages the horizontal scroll display 228 to account for the electronic messages currently displayed in the messaging thread GUI 214. In at least one embodiment, the electronic communication system 100 continues to track the number of unread messages if the user simply scrolls beyond the currently displayed electronic messages rather than selecting another highlight excerpt. In alternative embodiment, the system assumes that the user has read all messages preceding the highlight message 226 and updates the number of unread messages accordingly.

The embodiment of the electronic communication system 100 shown in FIGS. 3A-3E illustrates how the electronic communication system 100 provides one or more identified highlight messages to the user of the client-computing device 202 via the horizontal scroll display 228. In additional or alternative embodiments, the electronic communication system 100 can provide identified highlight messages in other ways. For example, as will be described with reference to FIGS. 4A-4F, the electronic communication system 100 can provide identified highlight messages via a graphical user interface in another way.

Figure 4B:
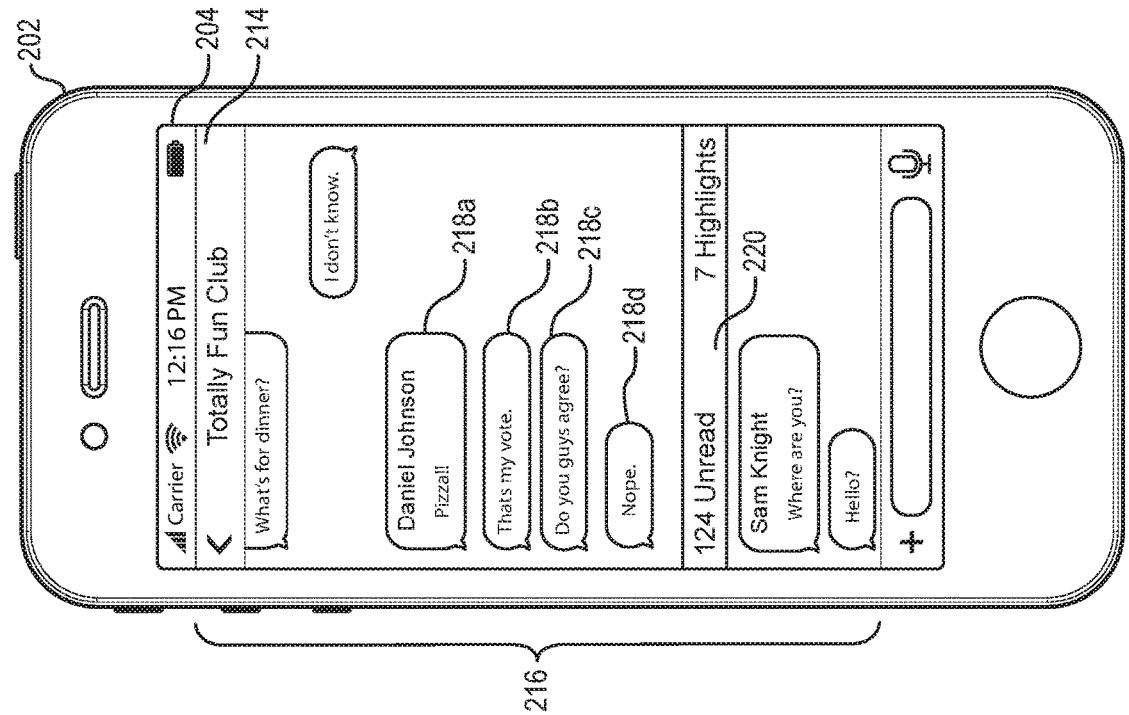
FIGS. 4A-4F illustrate a series of graphical user interfaces illustrating various features in accordance with one or more embodiments of the electronic communication system.
Figure 4A:
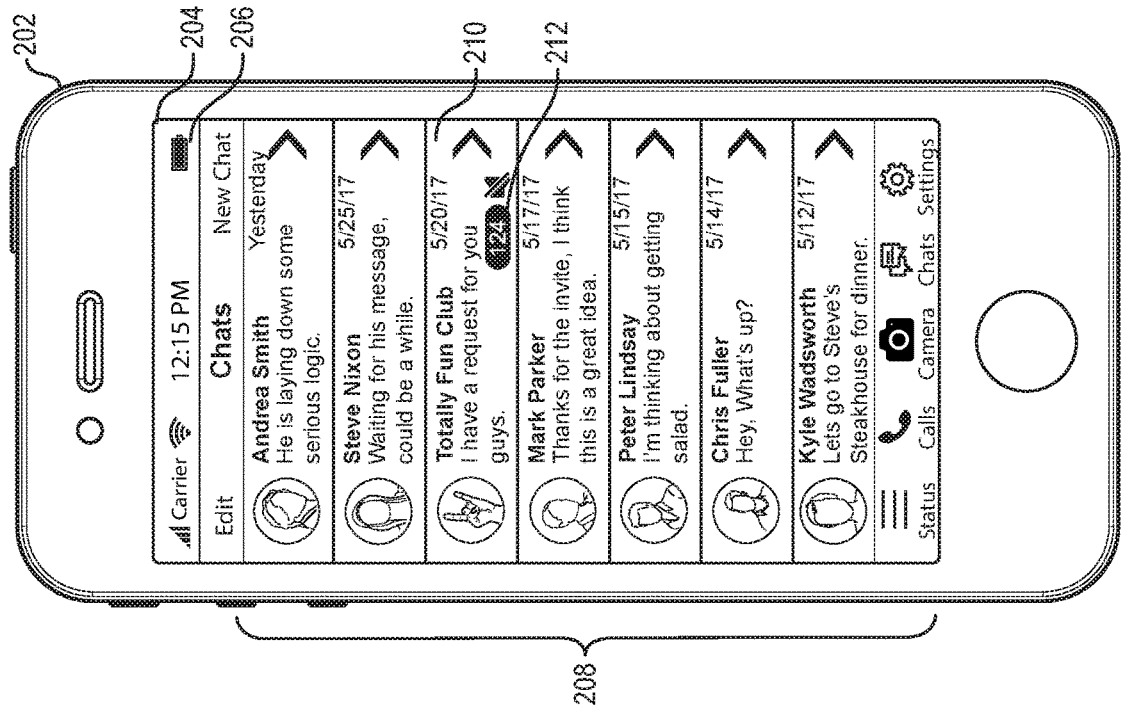

FIG. 4A illustrates the messaging thread list 208 in the thread listing GUI 206 provided by the messaging application on the touch screen display 204 of the client-computing device 202. As described with reference to FIGS. 2A and 3A, in FIG. 4A and in response to a detected selection of the messaging thread control 210 including the missed messages indicator 212, the messaging application provides the messaging thread GUI 214 on the touch screen display 204 of the client-computing device 202. Similar to FIGS. 2B and 3B, the messaging thread GUI 214 in FIG. 4B includes the group messaging thread 216 of electronic messages (e.g., the electronic messages 218a-218d) exchanged between the participants in the group messaging thread 216.

Further illustrated in FIG. 4B, in one or more embodiments, the messaging application provides the last read position bar 220 directly adjacent to the last electronic message read by the user of the client-computing device 202 (e.g., the electronic message 218d). As described above with reference to FIGS. 2B and 3B, the messaging application determines when the user of the client-computing device 202 becomes absent from the group messaging thread 216 and identifies one or more electronic messages added to the group messaging thread 216 by other group messaging thread participants during the period of absence corresponding to the user of the client-computing device 202. The messaging application then calculates a score for each added electronic message and identifies one or more highlight messages based on the calculated scores.

In one or more embodiments, the last read position bar 220 is selectable. For example, in response to detecting a selection of the last read position bar 220, the messaging application replaces the messaging thread GUI 214 with another GUI dedicated to highlight messages. For instance, as shown in FIG. 4C, in response to detecting a selection of the last read position bar 220, the messaging application replaces the messaging thread GUI 214 with the general highlight GUI 232. As shown in FIG. 4C, the messaging application can replace the messaging thread GUI 214 with the general highlight GUI 232 via a slide-over animation. Alternatively, the messaging application can replace the messaging thread GUI 214 with the general highlight GUI 232 via other types of animation (e.g., a fade-out/fade-in).

Figure 4D:
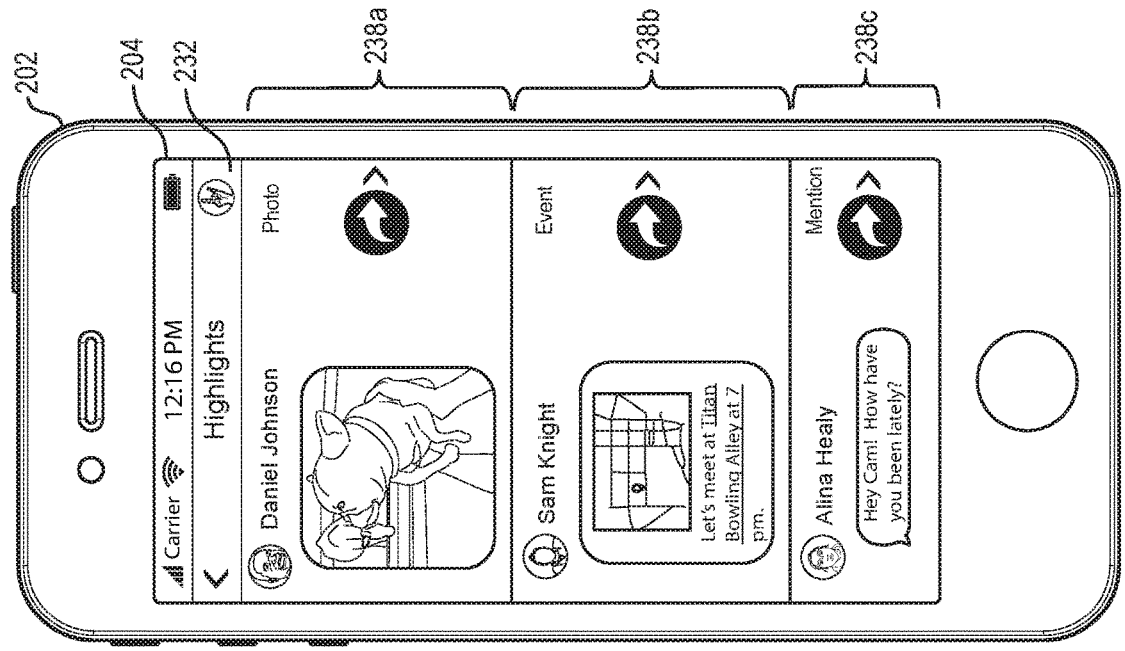
Figure 4C:
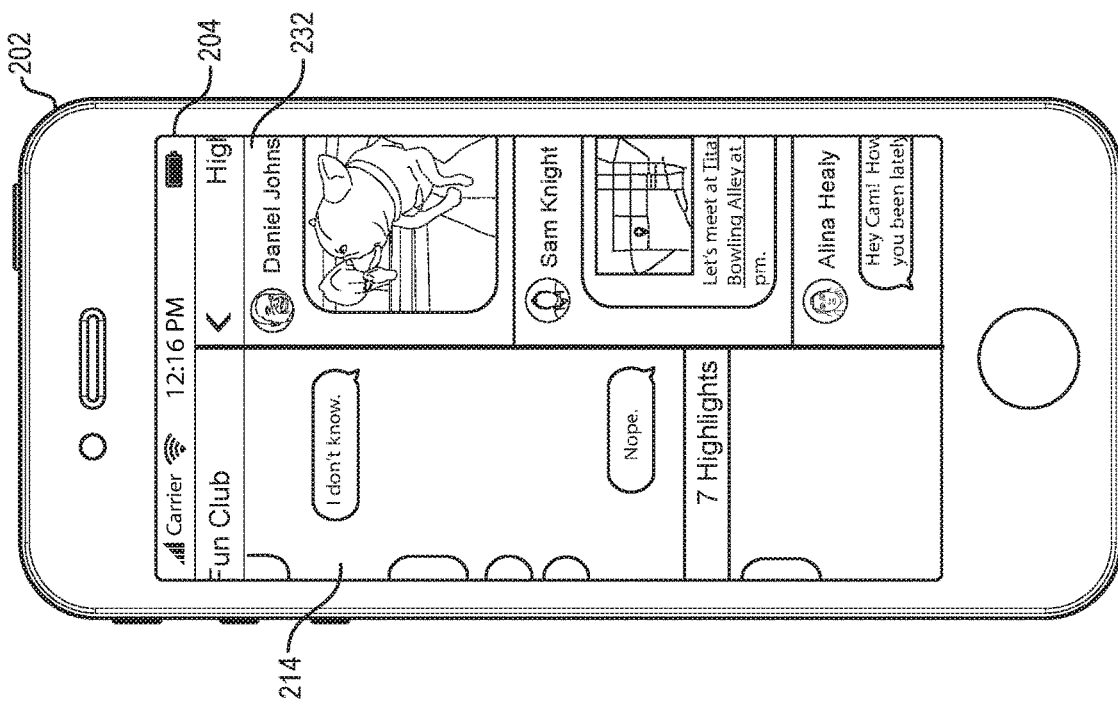

As illustrated in FIG. 4D, the general highlight GUI 232 includes a listing of highlight messages 238a, 238b, and 238c. In one or more embodiments, the messaging application copies each of the highlight messages 238a-238c from the group messaging thread 216 in response to determining that each highlight message 238a-238c has a high calculated score. Additionally, in at least one embodiment, the messaging application positions each highlight message 238a-238c in the general highlight GUI 232 based on the calculated scores associated with each corresponding highlight message. For example, the calculated score for the highlight message 238a may be higher than the scores for the electronic messages associated with the highlight messages 238b and 238c. In an alternative embodiment, the messaging application positions each highlight message 238a-238c in the general highlight GUI 232 based on the rank associated with each corresponding electronic message. For example, the rank for the electronic message associated with the highlight message 238a may be higher than the scores for the electronic messages associated with the highlight messages 238b and 238c.

Figure 4F:
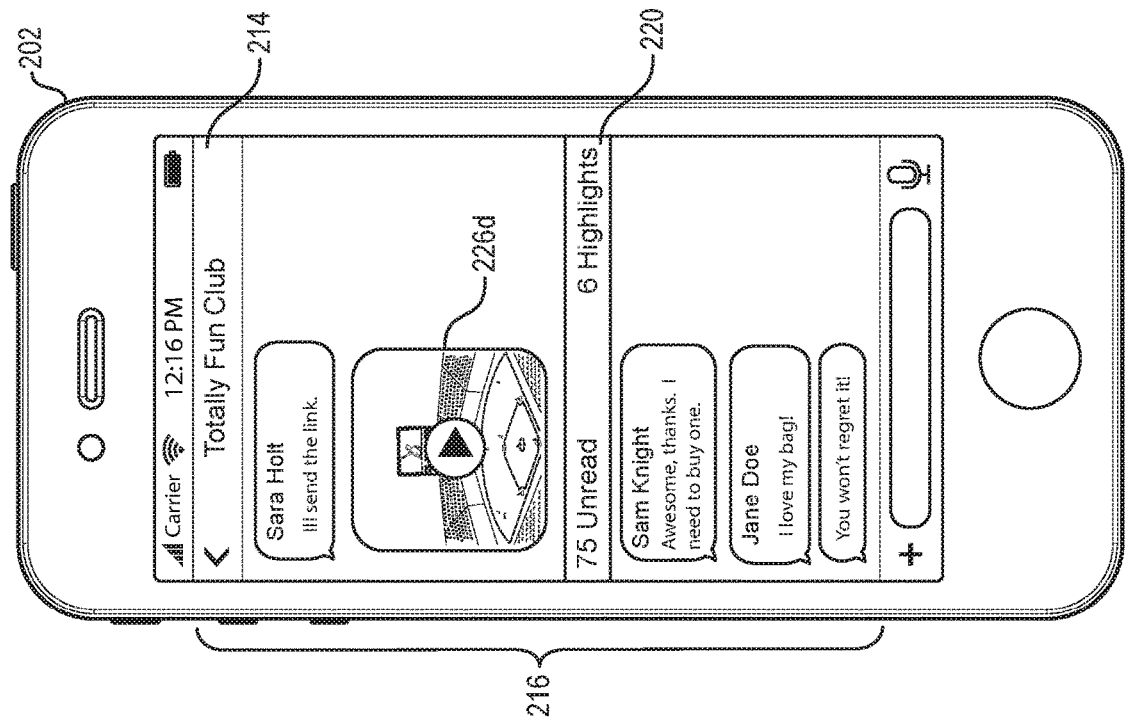
Figure 4E:
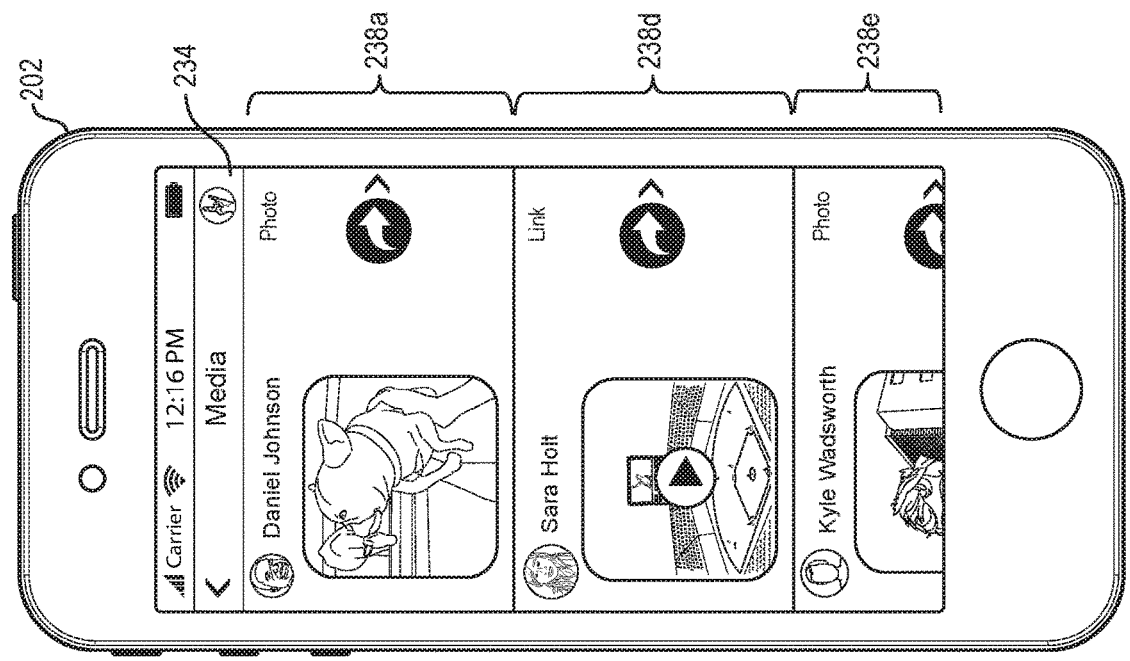

As shown in FIG. 4D, the general highlight GUI 232 includes highlight messages from several categories of electronic messages. For example, the highlight message 238a is associated with a media electronic message. Further, the highlight message 238b is associated with an event electronic message, and the highlight message 238c is associated with a mention electronic message. In additional or alternative embodiments, the messaging application can provide additional graphical user interfaces including specific categories of highlight messages. For example, in one or more embodiments, in response to detected user interaction with the general highlight GUI 232 (e.g., a swipe-left touch gesture), the messaging application replaces the general highlight GUI 232 with the category highlight GUI 234, as shown in FIG. 4E. As shown in FIG. 4E, the category highlight GUI 234 includes the highlight messages 238a, 238d, and 238e, each associated with a media electronic message.

In one or more embodiments, the messaging application provides a different types of category highlight GUIs in response to a detected user interaction with the general highlight GUI 232. For example, in one embodiment, in response to detecting a swipe-left touch gesture with the general highlight GUI 232, the messaging application provides the category highlight GUI 234 including highlight messages associated with mention electronic messages. In one or more embodiments, in response to detecting repeated left-swipes, the messaging application provides additional GUIs including further categories of highlight excerpts.

In at least one embodiment, the messaging application provides the categories of highlight messages based on factors associated with the user of the client-computing device 202. For example, the electronic communication system 100 can analyze the user's activity history relative to the electronic messaging system 108 to determine the types of highlight messages the user interacts with most frequently. Accordingly, the messaging application can provide the category highlight GUI 234 including highlight messages associated with electronic messages with which the user is most likely to interact.

In response to a detected selection of a highlight message, the messaging application navigates the group messaging thread 216 to a highlight message associated with the selected highlight excerpt. For example, in response to a detected selection of the highlight message 238d, the messaging application navigates the group messaging thread 216 to the highlight message 226d within the messaging thread GUI 214, as shown in FIG. 4F. In one or more embodiments, the messaging application also provides the last read position bar 220 directly adjacent to the highlight message 226d and updates the last read position bar 220 to reflect the user's current position in the group messaging thread 216 as well as the number of remaining unread highlight messages. In at least one embodiment, the messaging application provides the general highlight GUI 232 in response to another selection of the last read position bar 220.

Figure 5:
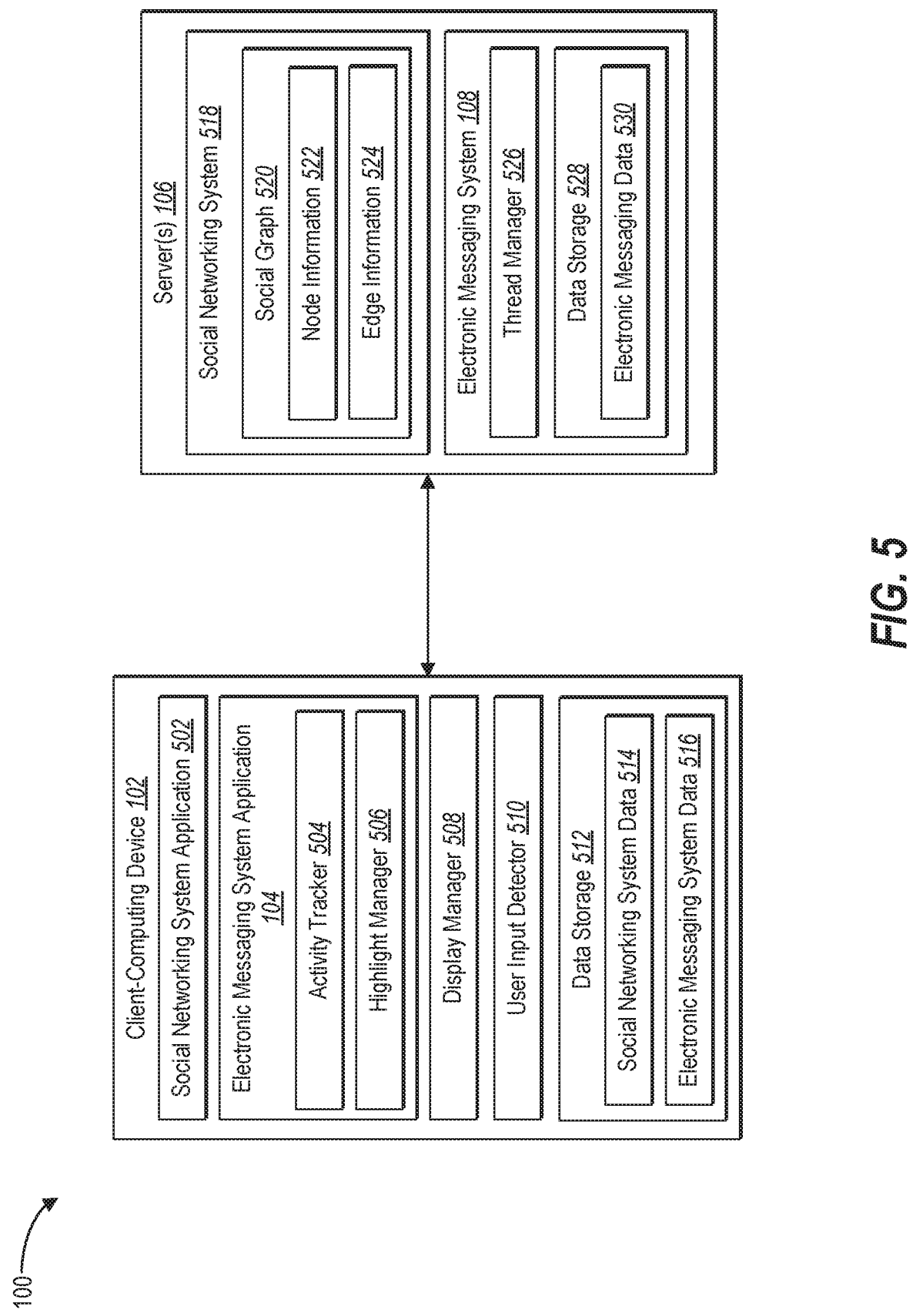
FIG. 5 illustrates a detailed schematic diagram of the electronic communication system in accordance with one or more embodiments.

Turning now to FIG. 5, additional detail is provided regarding components and capabilities of the electronic communication system 100 in accordance with one or more embodiments. In particular, FIG. 5 illustrates a schematic diagram of another example embodiment of the electronic communication system 100. As shown in FIG. 5, the electronic communication system 100 includes various components for performing the processes and features described herein. For example, as shown in FIG. 5, the electronic communication system 100 includes but is not limited to, the client-computing device 102 and the server(s) 106 hosting a social networking system 518 and the electronic messaging system 108. Further illustrated in FIG. 5, the social networking system 518 includes a social graph 520 with node information 522 and edge information 524. Also illustrated in FIG. 4, the electronic messaging system 108 includes the thread manager 526 and data storage 528 including electronic messaging data 530. Additionally, the client-computing device 102 includes the social networking system application 502, the electronic messaging system application 104 including the activity tracker 504 and the highlight manager 506, the display manager 508, the user input detector 510, and the data storage 512 including social networking system data 514 and electronic messaging system data 516.

In at least one embodiment, the electronic communication system 100 accesses the social networking system 518 in order to identify and analyze social networking system user data. Accordingly, as shown in FIG. 5, the social networking system 518 includes the social graph 520 for representing a plurality of users, actions, and concepts. For example, in one or more embodiments, the social graph 520 is accessible by the social networking system 518 and the electronic messaging system 108. In one or more embodiments, the social graph 520 includes node information 522 and edge information 524. Node information 522 of the social graph 520 stores information including, for example, nodes for users and nodes for repositories. Edge information 524 of the social graph 520 stores information including relationship between nodes and/or actions occurring within the social networking system 518. Further details regarding the social networking system 518, the social graph 520, edges, and nodes are presented below with respect to FIG. 12.

Each of the components 104 and 502-512 of the client-computing device 102, the components 520 of the social networking system 518, and the components 526-528 of the electronic messaging system 108 can be implemented using a computing device including at least one processor executing instructions that cause the electronic communication system 100 to perform the processes described herein. In some embodiments, the components of the electronic communication system 100 can be implemented by the server(s) 106, or across multiple server devices. Additionally or alternatively, a combination of one or more server devices and one or more client devices can implement the components of the electronic communication system 100. Additionally or alternatively, the components of the electronic communication system 100 can comprise a combination of computer-executable instructions and hardware.

In one or more embodiments, the social networking system application 502 and/or the electronic messaging system application 104 (e.g., the messaging application described with reference to FIGS. 2A-4F) are native applications installed on the client-computing device 102. For example, the social networking system application 502 and/or the electronic messaging system application 104 can be mobile applications that install and run on a mobile device, such as a smart phone or tablet computer. Alternatively, the social networking system application 502 and/or the electronic messaging system application 104 can be desktop applications, widgets, or other forms of a native computer programs. Furthermore, the social networking system application 502 and/or the electronic messaging system application 104 may be remote applications accessed by the client-computing device 102. For example, the social networking system application 502 and/or the electronic messaging system application 104 may be web applications that are executed within a web browser of the client-computing device 102.

In one or more embodiments, the social networking system application 502 provides graphical user interfaces and interactive display elements that enable the user of the client-computing device 102 to interact with the social networking system 518. For example, the social networking system application 502 enables the user of the client-computing device 102 to view and compose social networking system posts, submit comments, "Like" posts and digital media, and so forth. Accordingly, the social networking system application 502 provides and receives information to and from the social networking system 518 hosted by the server(s) 106.

As mentioned above, and as shown in FIG. 5, the client-computing device 102 also includes the electronic messaging system application 104 (e.g., the electronic messaging system application 104a, 104b, or 104c illustrated in FIG. 1). In one or more embodiments, the electronic messaging system application 104 provides access to features of the electronic communication system 100, as well as to features of the electronic messaging system 108.

As further shown in FIG. 5, the electronic messaging system application 104 includes the activity tracker 504. In one or more embodiments, the activity tracker 504 monitors the usage and activity rate associated with the electronic messaging system application 104. For example, in one or more embodiments, the activity tracker 504 detects and monitors how the user of the client-computing device 102 utilizes the electronic messaging system application 104. To illustrate, the activity tracker 504 detects how often the user of the client-computing device 102 accesses the electronic messaging system application 104, the types of messaging threads with which the user interacts (e.g., group messaging threads, two-person messaging thread, messaging threads including a commercial business entity), the types of messaging thread conversations the user engages with most frequently (e.g., conversations planning an event, conversations discussing politics, conversations sharing media items), how long the user's absences from group messaging threads last, whether and how often the user interacts with highlight messages, and the types of highlight messages with which the user interacts most frequently.

Additionally, in one or more embodiments, the activity tracker 504 determines when the user of the client-computing device 102 becomes absent from a particular group messaging thread. For example, in at least one embodiment, the activity tracker 504 constantly monitors the user's interactions with the group messaging thread. When the user stops interacting with the group messaging thread for a threshold amount of time, the activity tracker 504 determines that the user's period of absence has begun. More specifically, the activity tracker 504 determines a timestamp associated with each of the user's interactions with the group messaging thread. When the activity tracker 504 fails to determine a user interaction timestamp for a threshold amount of time (e.g., one minute, 5 minutes, 30 minutes), the activity tracker 504 determines that the user's period of absence began at the last determined timestamp. When the user next accesses and/or interacts with the group messaging thread, the activity tracker 504 determines a timestamp associated with this new activity. In one or more embodiments, the activity tracker 504 determines that the user's period of absence includes the time in-between the timestamp at the beginning of the user's period of absence and the timestamp at the end of the user's period of absence.

As shown in FIG. 5, and as mentioned above, the electronic messaging system application 104 further includes a highlight manager 506. In one or more embodiments, the highlight manager 506 handles all activities involved in identifying and providing highlight messages to the user of the client-computing device 102. For example, in one or more embodiments, the highlight manager 506 identifies all electronic messages submitted to a group messaging thread during a period of absence associated with the user of the client-computing device 102. As discussed above, the activity tracker 504 determines starting and ending timestamps associated with the user's period of absence from a group messaging thread. Accordingly, in at least one embodiment, the highlight manager 506 identifies all electronic messages submitted to the group messaging thread during the user's period of absence by identifying all electronic messages in the stack associated with the group messaging thread that are associated with a timestamp that falls in-between the starting and ending timestamps associated with the user's period of absence.

After identifying all electronic messages in the group messaging thread that were submitted by other participants during the user's period of absence, the highlight manager 506 calculates a score for each identified electronic message based on characteristics associated with the electronic message and characteristics associated with the user of the client-computing device 102. For example, in one or more embodiments, the highlight manager 506 determines characteristics associated with an electronic message by analyzing the contents of the electronic message. For instance, the highlight manager 506 can analyze digital media items included in an electronic message to determine a type associated with the digital media (e.g., digital photograph or digital video), and to determine what is depicted by the digital media (e.g., by performing image analysis and/or metadata analysis).

Furthermore, the highlight manager 506 determines characteristics associated with an electronic message by analyzing text associated with the electronic message. For example, the highlight manager 506 can analyze text associated with the electronic message to identify a question within the text, event information within the text, a hyperlink within the text, or a mention of the user of the client-computing device 102 within the text. In one or more embodiments, the highlight manager 506 utilizes one or more techniques including natural language processing, machine learning, grammars, databases, and social networking system information analysis in order to analyze the text associated with an electronic message.

In one or more embodiments, the highlight manager 506 further determines characteristics associated with an electronic message by analyzing surrounding electronic message activity. For example, in at least one embodiment, the level of group engagement corresponding to an electronic message is a characteristic that can affect the score calculated for that electronic message. Accordingly, the highlight manager 506 can analyze surrounding electronic message activity by identifying electronic messages that immediately preceding (e.g., leading up to) the electronic message being analyzed, as well as electronic messages that immediately follow the electronic message being analyzed. In one embodiment, the highlight manager 506 identifies a predefined number of preceding and succeeding electronic messages. Alternatively, the highlight manager 506 can identify a number of preceding and succeeding electronic messages that represent a predefined percentage of the entire group messaging thread.

With a number of preceding and succeeding electronic messages identified, in one or more embodiments, the highlight manager 506 analyzes timestamps associated with the preceding and succeeding electronic messages relative to the electronic message being analyzed to determine how the analysis electronic message affected the level of group engagement. For example, the highlight manager 506 can analyze the timestamps associated with the preceding and succeeding electronic messages relative to the analysis electronic message to determine whether an increase in the rate of messaging followed the analysis electronic message, whether an increase in the number of messages per minute followed the analysis electronic message, or whether the analysis electronic message engaged group messaging thread participants after a lull (e.g., a long pause in the submission of electronic messages to the group messaging thread). In at least one embodiment, these characteristics indicate that the analysis electronic message introduced a new topic, triggered or reinvigorated the current conversation.

The highlight manager 506 can also analyze the contents of preceding and succeeding electronic messages relative to the analysis electronic message to determine whether an increase in message length followed the analysis electronic message. For example, if the message length associated with the electronic messages that succeeding the analysis electronic message increases, the highlight manager 506 may determine that the analysis electronic message likely caused an increase in group engagement.

In one or more embodiments, the highlight manager 506 further determines characteristics associated with an electronic message by analyzing the electronic message relative to the user of the client-computing device 102. For example, in at least one embodiment, the highlight manager 506 accesses social networking system information (e.g., via the social networking system application 502, or directly from the social networking system 518). From this information, the highlight manager 506 can determine the user's interests, occupation, and demographic information, as well as relationship coefficients the user shares with other social networking system users. In at least one embodiment, the highlight manager 506 can utilize the social networking system information to determine whether the user of the client-computing device 102 shares a relationship coefficient with the sender of an electronic messages via the social networking system 518. Thus, if an identified relationship coefficient between the user of the client-computing device 102 and the sender of an electronic message is sufficiently high (e.g., higher than a predetermined threshold), the highlight manager 506 can determine that the identified relationship coefficient is a characteristic of the electronic message.

After identifying one or more characteristics of an electronic message, the highlight manager 506 calculates a score for the electronic message based on the identified one or more characteristics. For example, in at least one embodiment, the highlight manager 506 assigns a weighted scalar value to each identified characteristic and calculates the score for the electronic message by summing the weighted scalar values. In one or more embodiments, the highlight manager 506 weights the scalar values based the importance of various characteristics. For example, an identified mention of the user of the client-computing device 102 in an electronic message is a characteristic that the highlight manager 506 may weight heavier than a digital photograph being included in the electronic message.

After calculating scores for each electronic message that was submitted to the group messaging thread during the period of absence associated with the user of the client-computing device 102, the highlight manager 506 identifies one or more highlight messages among the scored electronic messages. In one or more embodiments, the highlight manager 506 identifies one or more highlight messages by identifying electronic messages with a calculated score above a predetermined threshold. Additionally or alternatively, the highlight manager 506 can identify one or more highlight messages by identifying a top percentage of scored electronic messages. Additionally or alternatively, the highlight manager 506 can identify one or more highlight messages by identifying a top number of scored electronic messages.

In one or more embodiments, the highlight manager 506 also categorizes identified highlight messages. As discussed above, in some embodiments, the electronic communication system 100 provides identified highlight messages to the user of the client-computing device 102 in categories. For example, as shown in FIG. 4D, the electronic communication system 100 provides the category highlight GUI including excerpts associated with all identified media highlight messages. Thus, in one or more embodiments, the highlight manager 506 categorizes identified highlight messages by determining a type associated with each highlight message based on the characteristics discussed above. For example, if a highlight message is associated with a characteristic indicating the highlight message includes a digital media item, the highlight manager 506 categorizes that highlight message as a media highlight message. Similarly, if a highlight message is associated with a characteristic indicating the highlight message includes a mention of the user of the client-computing device 102, the highlight manager 506 categorizes that highlight message as a mention highlight message. In one or more embodiments, the highlight manager 506 categorizes highlight messages into categories including, but not limited to, media, mention, hyperlink, event, audio, and interests.

In one or more embodiments, the highlight manager 506 also ranks identified highlight messages. As described above, the electronic communication system 100 presents identified highlight messages to the user of the client-computing device 102 simply based on each highlight messages' calculated score. Alternatively, also as described above, the electronic communication system 100 can present identified highlight messages in a ranked order based on additional considerations. Accordingly, in one or more embodiments, the highlight manager 506 ranks the identified highlight messages based on one or more of the scores associated with the identified highlight messages, social networking system information associated with the user of the client-computing device 102, or electronic messaging system information associated with the user of the client-computing device 102.

For example, the highlight manager 506 can rank the identified highlight messages based on the scores associated with the identified highlight messages by simply assigning the highest rank to the highest scored highlight message, and so forth in descending order. Additionally or alternatively, the highlight manager 506 can rank the identified highlight messages based on social networking system information associated with the user of the client-computing device 102 by analyzing social networking system information associated with the user to identify the user's activities, interests, demographic information, and relationships. In at least one embodiment, the highlight manager 506 can assign the highest rank to an identified highlight message with the strongest association with the user's social networking system information, and so forth in descending order. Additionally or alternatively, the highlight manager 506 can rank the identified highlight messages based on electronic messaging system information associated with the user of the client-computing device 102 by analyzing electronic messaging system information to identify communication threads with which the user frequently interacts, types of highlight messages with which the user frequently interacts, and types of highlight excerpts with which the user frequently interacts. In at least one embodiment, the highlight manager 506 can assign the highest rank to the identified highlight message with the strongest association with the user's electronic messaging system information, and so forth in descending order.

Furthermore, in one or more embodiments, the highlight manager 506 generates highlight excerpts associated with each of the identified highlight messages. As described above, in some embodiments and in order to save display space and reduce visual clutter, the electronic messaging system application 104 presents highlight excerpts rather than the full highlight messages. Accordingly, the highlight manager 506 generates a highlight excerpt associated with a highlight message by including within the highlight excerpt with the most relevant portions of the highlight message. For example, if the highlight message includes a digital media item, the highlight manager 506 can extract the digital media item for inclusion in the associated highlight excerpt. Similarly, if the highlight message includes only text, the highlight manager 506 extracts the most relevant portion of the text for inclusion in the associated highlight excerpt. In at least one embodiment, the highlight manager 506 can include an interactive element in a highlight excerpt. For example, if the highlight excerpt includes the text of a question directed at the user of the client-computing device 102, the highlight manager 506 can include a selectable link or button in the associated highlight excerpt that, when selected, automatically populates a text box with a mention of the sender of the highlight message. Furthermore, the highlight manager 506 includes a highlight message's group message thread identifier as part of the associated highlight excerpt.

Additionally, the highlight manager 506 presents identified highlight messages and/or highlight excerpts to the user of the client-computing device 102. For example, as described above, in one embodiment, the highlight manager 506 generates and provides a selectable display element (e.g., the highlight message control 222 as shown in FIG. 2B) based on identified highlight messages. In another embodiment, the highlight manager 506 generates and provides a horizontally scrollable display (e.g., the horizontal scroll display 228 as shown in FIG. 3B) including generated highlight excerpts associated with identified highlight messages. In a further embodiment, the highlight manager 506 generates and provides one or more highlight interfaces (e.g., the general highlight GUI 232 as shown in FIG. 4D or the category highlight GUI 234 as shown in FIG. 4E) including generated highlight excerpts associated with identified highlight messages.

In one or more embodiments, the highlight manager 506 determines which display of highlight messages and/or highlight excerpts to provide to the user of the client-computing device 102. For example, as described above, the electronic communication system 100 can include different buttons in different orders within the highlight message control 222 as shown in FIG. 2B. Furthermore, the electronic communication system 100 can provide various category highlight GUIs (e.g. the category highlight GUI 234 as shown in FIG. 4E) in various orders. Accordingly, in one or more embodiments, the highlight manager 506 analyzes electronic messaging system information associated with the user of the client-computing device 102 in order to determine which types or categories of highlight messages and highlight excerpts with which the user most frequently interacts. Furthermore, by analyzing the user's electronic messaging system information, the highlight manager 506 can determine whether to provide a selectable display element (e.g., as described with reference to FIGS. 2A-2E), a horizontally scrollable display (e.g., as described with reference to FIGS. 3A-3E), or additional graphical user interfaces (e.g., as described with reference to FIGS. 4A-4F).

Additionally, the highlight manager 506 navigates to a highlight message within the group messaging thread in response to a detected user interaction with a selectable display element (e.g., as described with reference to FIGS. 2A-2E), a horizontally scrollable display (e.g., as described with reference to FIGS. 3A-3E), or additional graphical user interfaces (e.g., as described with reference to FIGS. 4A-4F). For example, the electronic messaging system 108 assigns a thread identifier to each electronic message in a communication thread. In one or more embodiments, an electronic message's thread identifier provides the electronic message's display position within the communication thread. Accordingly, in response to a detected selection of a button within the selectable display element (e.g., as described with reference to FIGS. 2A-2E), or a detected selection of a highlight excerpt (e.g., as described with reference to FIGS. 3A-3E, or as described with reference to FIGS. 4A-4F), the highlight manager 506 navigates the group communication thread to a display position associated with the group messaging thread identifier referenced in the selected highlight message or highlight excerpt.

As mentioned above, and as shown in FIG. 5, the client-computing device 102 includes the display manager 508. In one or more embodiments, the display manager 508 interacts with both the social networking system application 502 and the electronic messaging system application 104. The display manager 508 provides, manages, and/or controls graphical user interfaces that allow a user to interact with the electronic communication system 100. For example, the display manager 508 provides a graphical user interface that facilitates the display of a social networking system user's newsfeed. Similarly, the display manager 508 provides a graphical user interface that displays the contents of a group messaging thread (e.g., the group communication thread 216).

More specifically, the display manager 508 facilitates the display of a graphical user interface (e.g., by way of a touch screen display associated with the client-computing device 102). For example, the display manager 508 may compose the graphical user interface of a plurality of graphical components, objects, and/or elements that allow a user to view and interact with communication threads. Further, the display manager 508 directs the client-computing device 102 to display one or more graphical objects, controls, or elements that facilitate user input for interacting with communication threads. For example, in one or more embodiments, the display manager 508 provides a graphical user interface that includes a touch screen keyboard.

Additionally, the display manager 508 is capable of transitioning between two or more graphical user interfaces and/or applications. For example, in one embodiment, the display manager 508 provides a newsfeed to the user of the client-computing device 102 within the social networking system application 502, containing one or more social networking system posts from co-users associated with the user via the social networking system 518. Later, in response to a detected input, the display manager 508 transitions to a second graphical user interface within the electronic messaging system application 104 that includes a listing of one or more communication threads. Alternatively, in response to a detected input, the display manager 508 transitions within graphical user interfaces provided by the same application.

As further illustrated in FIG. 5, the client-computing device 102 includes a user input detector 510. As with the display manager 508, in one or more embodiments, the user input detector 510 interacts with both the social networking system application 502 and the electronic messaging system application 104. In one or more embodiments, the user input detector 510 detects, receives, and/or facilitates user input in any suitable manner. In some examples, the user input detector 510 detects one or more user interactions with a graphical user interface. As referred to herein, a "user interaction" means a single interaction, or combination of interactions, received from a user by way of one or more input devices.

For example, the user input detector 510 detects a user interaction from a keyboard, mouse, touch pad, touch screen, and/or any other input device. In the event the client-computing device 102 includes a touch screen, the user input detector 510 detects one or more touch gestures (e.g., swipe gestures, tap gestures, pinch gestures, reverse pinch gestures, etc.) from a user that forms a user interaction. In some examples, a user can provide the touch gestures in relation to and/or directed at one or more graphical objects or graphical elements of a graphical user interface.

The user input detector 510 may additionally, or alternatively, receive data representative of a user interaction. For example, the user input detector 510 may receive one or more user configurable parameters from a user, one or more commands from the user, and/or any other suitable user input. The user input detector 510 may receive input data from one or more components of the social networking system 518, from the electronic messaging system 108, or from one or more remote locations.

The social networking system application 502 and/or the electronic messaging system application 104 performs one or more functions in response to the user input detector 510 detecting user input and/or receiving other data. Generally, a user can control, navigate within, and otherwise use the social networking system application 502 and/or the electronic messaging system application 104 by providing one or more user input that the user input detector 510 can detect. For example, in response to the user input detector 510 detecting user input, one or more components of the social networking system application 502 allow a user to scroll through a newsfeed, select a digital media item, or submit a comment to a post. Similarly, in response to the user input detector 510 detecting user input, one or more components of the electronic messaging system application 104 allow a user to view a messaging thread list, select a messaging thread control, or interact with a communication thread.

As shown in FIG. 5, and as mentioned above, the client-computing device 102 includes the data storage 512. The data storage 512 includes social networking system data 514 and electronic messaging system data 516. In one or more embodiments, the social networking system data 514 is representative of social networking system information, such as described herein. In one or more embodiments, the electronic messaging system data 516 is representative of electronic messaging information, such as described herein.

As further shown in FIG. 5, and as mentioned above, the server(s) 106 hosts the social networking system 518. The social networking system 518 provides social networking system posts to one or more users of the social networking system 518 (e.g., by way of a profile, a newsfeed, a timeline, or a "wall"). For example, one or more embodiments provide a user with a social networking system newsfeed including posts from one or more co-users associated with the user via the social networking system 518. In one or more embodiments, the user scrolls through the social networking system newsfeed, interacting with posts and other content of interest.

Also shown in FIG. 5, the server(s) 106 supports the electronic messaging system 108. As discussed above, the electronic messaging system 108 provides dedicated electronic messaging services to the users of the electronic messaging system 108. For example, the electronic messaging system 108 maintains a stack of communication threads associated with each electronic messaging system user. The electronic messaging system 108 can add a communication thread (or electronic message) to a particular stack in order to make the communication thread available to the user associated with the stack, or can remove a communication thread (or electronic message) from the stack in order to make the communication thread (or electronic message) unavailable to the user associated with the stack.

As shown in FIG. 5, the electronic messaging system 108 includes the thread manager 526. In one or more embodiments, the thread manager 526 receives and directs electronic messages submitted by participants of a communication thread. For example, in a group messaging thread between multiple participants, a first participant may submit an electronic message to the electronic messaging system 108 for inclusion in the group messaging thread. Accordingly, the thread manager 526 receives the submitted electronic message and provides the electronic message to the other participants in the group messaging thread. In at least one embodiment, the thread manager 526 provides a received electronic message to other messaging thread participants by adding the received electronic message to a communication thread stack associated with each of the other messaging thread participants.

Further shown in FIG. 5, and as mentioned above, the electronic messaging system 108 includes the data storage

528. The data storage 528 includes electronic messaging data 530. In one or more embodiments, the electronic messaging data 530 is representative of electronic messaging information, such as described herein.

FIGS. 1-5, the corresponding text and examples, provide a number of different methods, systems, and devices for identifying and providing one or more highlight messages associated with a group messaging thread. In addition to the foregoing, embodiments can also be described in terms of flowcharts comprising acts and steps in a method for accomplishing a particular result. For example, FIGS. 6-9 may be performed with less or more steps/acts or the steps/acts may be performed in differing orders. Additionally, the steps/acts described herein may be repeated or performed in parallel with one another or in parallel with different instances of the same or similar steps/acts.

Figure 6:
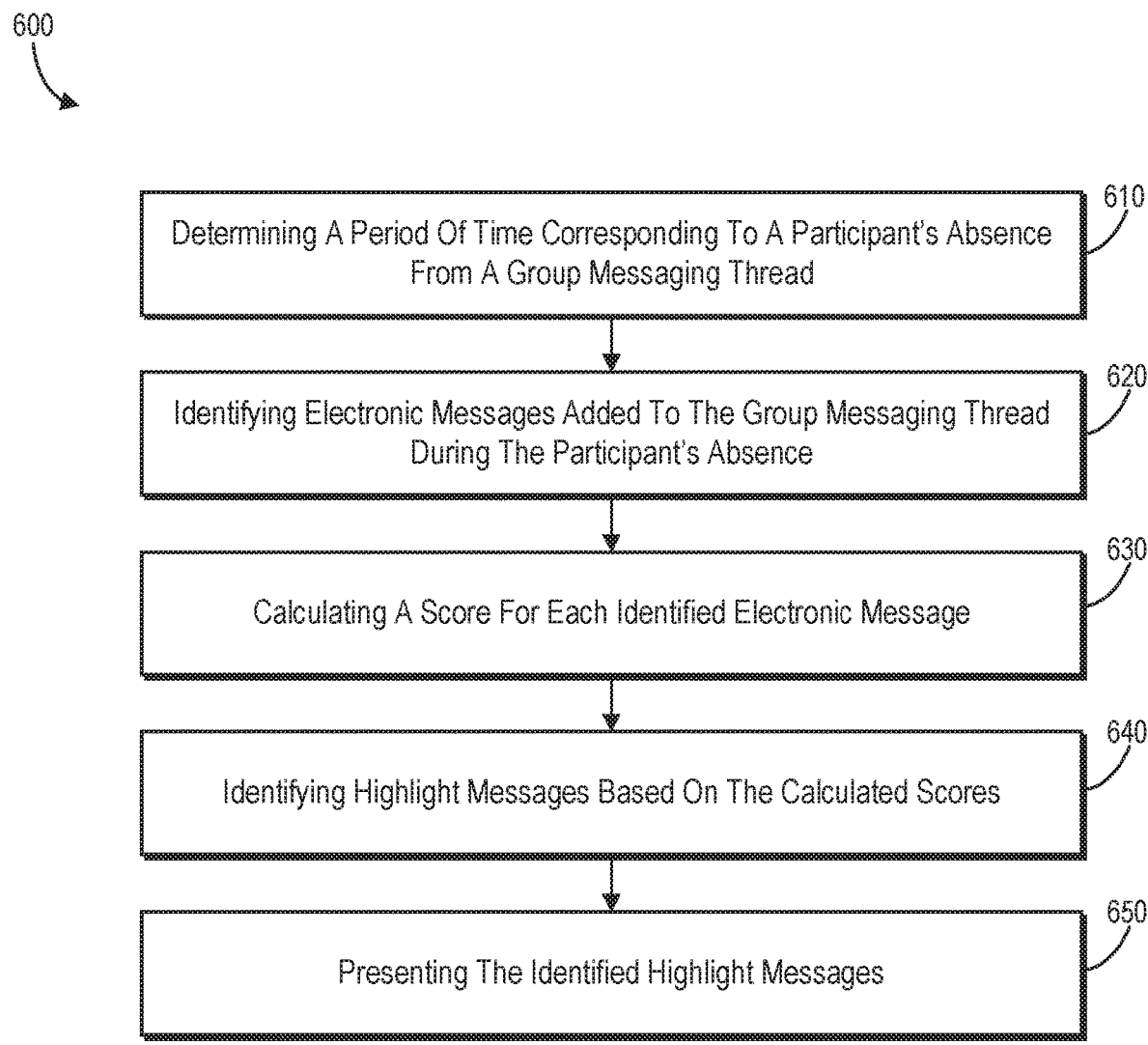
FIG. 6 illustrates a flowchart of a series of acts in a method of providing one or more highlight messages in accordance with one or more embodiments.

FIG. 6 illustrates a flowchart of one example method 600 of identifying one or more highlight messages in a group messaging thread. The method 600 includes an act 610 of determining a period of time corresponding to a participant's absence from a group messaging thread. In particular, the act 610 can involve determining, for a group messaging thread comprising a plurality of participants, a period of time corresponding to a participant's absence from the group messaging thread. For example, in order to determine the period of time corresponding to the participant's absence, the method 600 can further include an act of determining that the participant has not been active within the group messaging thread for more than a threshold amount of time. Furthermore, the method 600 can also include an act of determining the period of time corresponding to the participant's absence from the group messaging thread in response to the determination that the participant has not been active within the group messaging thread for more than the threshold amount of time.

The method 600 also includes an act 620 of identifying electronic messages added to the group messaging thread during the participant's absence. In particular, the act 620 can involve identifying a plurality of electronic messages added to the group messaging thread during the determined period of time corresponding to the participant's absence from the group messaging thread. For example, in one or more embodiments, identifying the plurality of electronic messages added to the group messaging thread during the determined period of time includes identifying a starting timestamp of the determined period of time and an ending timestamp of the determined period of time, and identifying the plurality of electronic messages that have timestamps that fall in between the starting timestamp and the ending timestamp.

Furthermore, the method 600 includes an act 630 of calculating a score for each identified electronic message. In particular, the act 630 can involve calculating, for each of the identified plurality of electronic messages, a score for the electronic message based on a plurality of characteristics associated with the electronic message and with the participant. For example, in one or more embodiments, calculating the score for the electronic message includes analyzing the electronic message to identify one or more digital media items within the electronic message, and calculating the score for the electronic message based on the identified one or more digital media items. In additional or alternative embodiments, calculating the score for the electronic message includes: analyzing text of the electronic message to identify one or more of a question within the electronic message, event information within the electronic message, a hyperlink within the electronic message, or a mention of the participant within the electronic message; and calculating the score for the electronic message based on the analysis of the text. In additional or alternative embodiments, calculating the score for the electronic message includes determining a networking system coefficient between a sender of the electronic message and the participant, and calculating the score for the electronic message based on the determined networking system coefficient.

In additional or alternative embodiments, calculating the score for the electronic message includes analyzing surrounding electronic message activity to determine a level of group engagement corresponding to the electronic message, and calculating the score for the electronic message based on the surrounding electronic message activity analysis. For example, in at least one embodiment, analyzing the surrounding electronic message activity to determine a level of group engagement includes identifying a plurality of immediately preceding electronic messages in the group messaging thread relative to the electronic message, identifying a plurality of succeeding electronic messages in the group messaging thread relative to the electronic message, identifying timestamps associated with the plurality of immediately preceding electronic messages and with the plurality of succeeding electronic messages, and determining the level of group engagement for the electronic message based on the identified timestamps.

The method 600 further includes an act 640 of identifying highlight messages based on the calculated scores. In particular, the act 640 can involve identifying, based on the calculated scores for the plurality of electronic messages, one or more highlight messages from the plurality of electronic messages. For example, in one or more embodiments, identifying one or more highlight messages from the plurality of electronic messages includes identifying one or more electronic messages having a calculated score above a predetermined threshold.

Additionally, the method 600 further includes an act 650 of presenting the identified highlight messages. In particular, the act 650 can involve, in response to the participant accessing the group messaging thread after the participant's absence from the group messaging thread, presenting the identified one or more highlight messages to the participant. For example, in one or more embodiments, presenting the identified one or more highlight messages to the participant is in response to detecting a selection of a display element associated with the one or more highlight messages.

Figure 7:
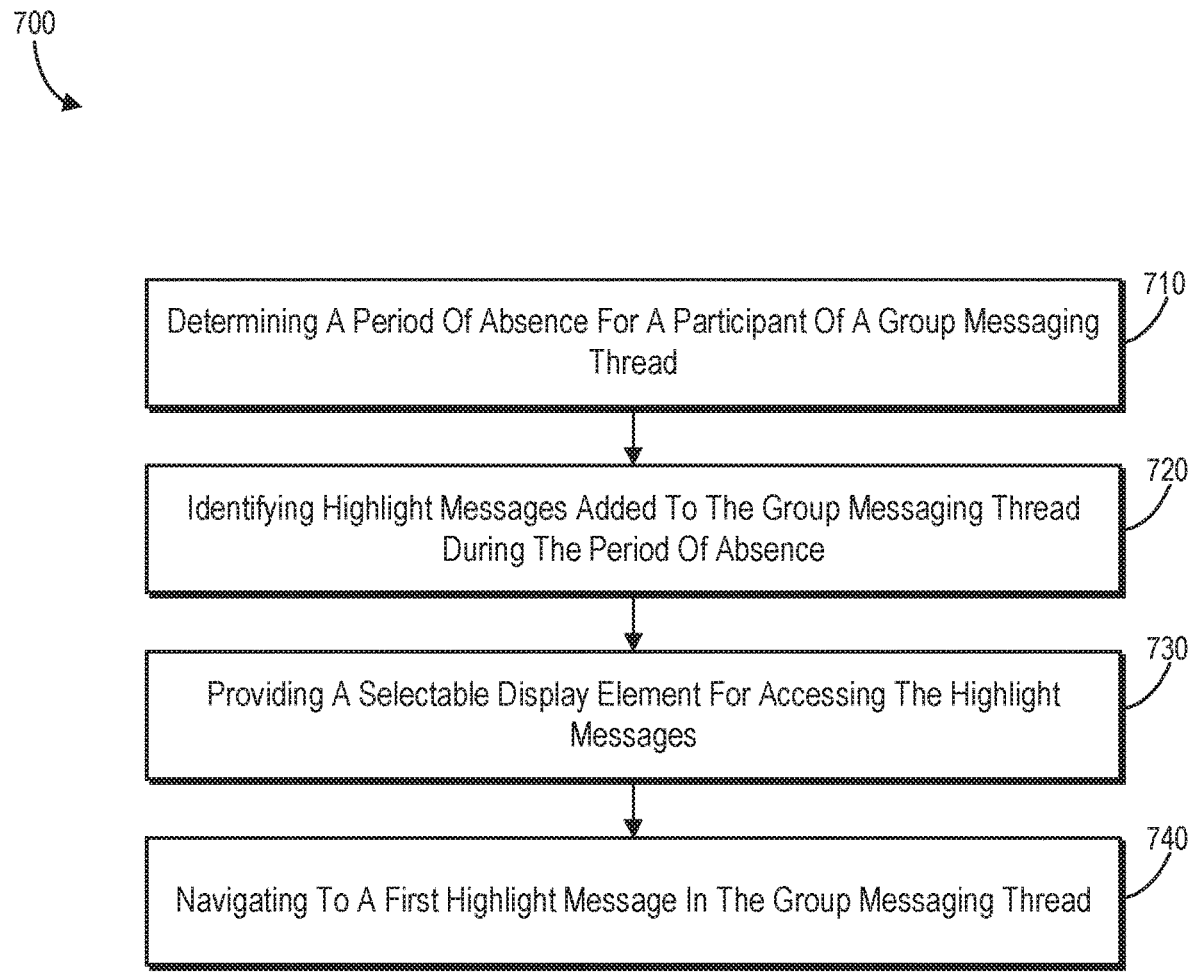
FIG. 7 illustrates a flowchart of a series of acts in a method of providing one or more highlight messages in a group messaging thread in accordance with one or more embodiments.

FIG. 7 illustrates a flowchart of one example method 700 of providing identified highlight messages to a group messaging thread participant. The method 700 includes an act 710 of determining a period of absence for a participant of a group messaging thread. In particular, the act 710 can involve determining, for a group messaging thread comprising a plurality of participants, a period of time corresponding to a participant's absence from the group messaging thread.

The method 700 also includes an act 720 of identifying highlight messages added to the group messaging thread during the period of absence. In particular, the act 720 can involve identifying one or more highlight messages from messages added to the group messaging thread during the determined period of time corresponding to the participant's absence from the group messaging thread. For example, identifying one or more highlight messages includes calculating a score for each of the plurality of electronic messages corresponding to the participant's absence from the group messaging thread, and determining electronic messages with a calculated score higher than a threshold score are highlight messages. In one or more embodiments, calculating the score for each of the plurality of electronic messages is based on one or more of a digital media item in each electronic message, a question within each electronic message, a hyperlink within each electronic message, event information within each electronic message, a mention of the participant within each electronic message, message activity surrounding each electronic message, or a networking system coefficient between the participant and a sender of each electronic message.

Furthermore, the method 700 includes an act 730 of providing a selectable display element for accessing the highlight message. In particular, the act 730 can involve, in response to the participant accessing the group messaging thread after the participant's absence from the group messaging thread, providing a selectable display element for accessing the one or more highlight messages within a graphical user interface for the group messaging thread, the selectable display element being positioned adjacent to the participant's last-read electronic message in the group messaging thread. For example, providing the selectable display element for accessing the one or more highlight messages can include determining a type associated with each of the one or more highlight messages, and configuring the selectable display element to indicate a number of each determined type of highlight message.

The method 700 also includes an act 740 of navigating to a first highlight message in the group messaging thread. In particular, the act 740 can involve, in response to a detected selection of the selectable display element, navigating, within the graphical user interface for the group messaging thread, to a first highlight message of the one or more highlight messages. For example, in one or more embodiments, navigating to the first highlight message of the one or more highlight messages includes identifying a group message thread identifier associated with the first of the one or more highlight messages, and navigating, within the graphical user interface for the group messaging thread, to the identified group message thread identifier.

In one or more embodiments, the method 700 further includes, in response to navigating to the first highlight message, repositioning the selectable display element within the graphical user interface for the group messaging thread, the selectable display element adjacent to the first highlight message. Additionally or alternatively, the method 700 can also include, after detecting the selection of the selectable display element and navigating to the first highlight message of the one or more highlight messages: detecting a second selection of the display element, and navigating, within the graphical user interface for the group messaging thread, to a second highlight message of the one or more highlight messages. In at least one embodiment, the method 700 includes an act of ranking the identified one or more highlight messages, wherein ranking the identified one or more highlight messages is based on one or more of the scores associated with the one or more highlight messages, networking system information associated with the participant, or electronic messaging system information associated with the participant, wherein navigating to the first highlight message of the one or more highlight messages comprises navigating to the highest ranked highlight message.

Figure 8:
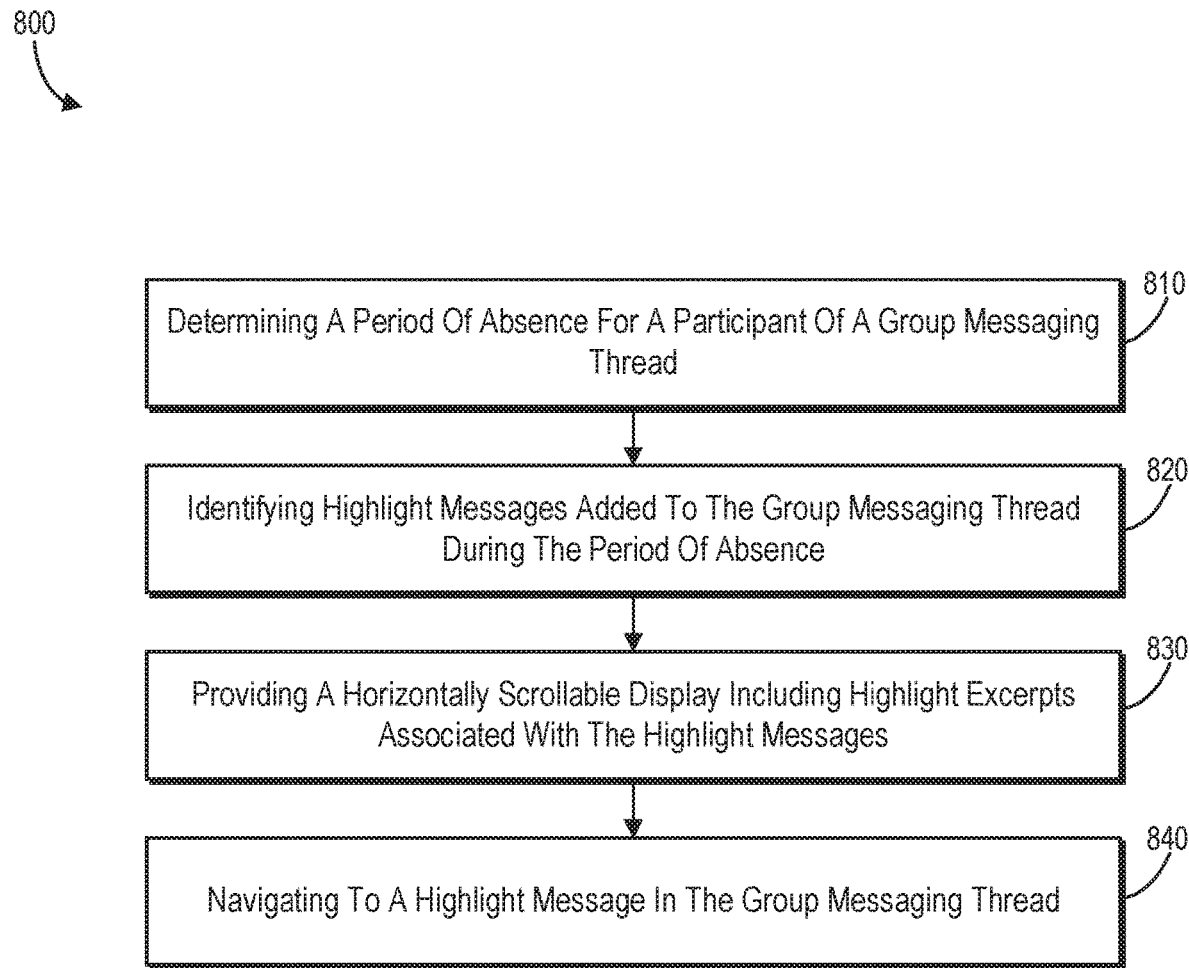
FIG. 8 illustrates a flowchart of a series of acts in a method of providing one or more highlight messages in a group messaging thread in accordance with one or more embodiments.

FIG. 8 illustrates a flowchart of one example method 800 of providing identified highlight messages to a group messaging thread participant. The method 800 includes an act 810 of determining a period of absence for a participant of a group messaging thread. In particular, the act 810 can involve determining, for a group messaging thread comprising a plurality of participants, a period of time corresponding to a participant's absence from a group messaging thread.

The method 800 also includes an act 820 of identifying highlight messages added to the group messaging thread during the period of absence. In particular, the act 820 can involve identifying one or more highlight messages from messages added to the group messaging thread during the determined period of time corresponding to the participant's absence from the group messaging thread. For example, in one or more embodiments, identifying one or more highlight messages includes calculating a score for each of the plurality of electronic messages corresponding to the participant's absence from the group messaging thread, and determining electronic messages with a calculated score higher than a threshold score are highlight messages. In at least one embodiment, calculating the score for each of the plurality of electronic messages is based on one or more of a digital media item in each electronic message, a hyperlink within each electronic message, a question within each electronic message, event information within each electronic message, a mention of the participant within each electronic message, message activity surrounding each electronic message, or a networking system coefficient between the participant and a sender of each electronic message.

Furthermore, the method 800 includes an act 830 of providing a horizontally scrollable display including highlight excerpts associated with the highlight messages. In particular, the act 830 can involve in response to the participant accessing the group messaging thread after the participant's absence from the group messaging thread, providing a horizontally scrollable display below a last electronic message accessed by the participant within a graphical user interface for the group messaging thread, the horizontally scrollable display comprising one or more highlight excerpts associated with the identified one or more highlight messages. For example, in one or more embodiments, providing the horizontally scrollable display comprising one or more highlight excerpts associated with the identified one or more highlight messages includes, for each identified highlight message, generating a highlight excerpt based on one or more of a media item from the highlight message, a text from the highlight message, or a hyperlink from the highlight message. In at least one embodiment, generating a highlight excerpt further includes: identifying a group messaging thread identifier associated with the highlight message, and associating the identified group messaging thread identifier with the highlight excerpt.

The method 800 further includes an act 840 of navigating to a highlight message in the group messaging thread. In particular, the act 840 can involve, in response to a detected selection of a highlight excerpt in the horizontally scrollable display, navigating, within the graphical user interface for the group messaging thread, to a highlight message associated with the selected highlight excerpt. For example, navigating to the highlight message associated with the selected highlight excerpt can include navigating, within the graphical user interface for the group messaging thread, to the group messaging thread identifier associated with the selected highlight excerpt.

In one or more embodiments, the method 800 further includes an act of ranking the one or more highlight excerpts based on one or more of the scores associated with the one or more highlight messages, networking system information associated with the participant, or electronic messaging system information associated with the participant. The method 800 can also include an act of positioning the one or more highlight excerpts in the horizontally scrollable display based on the ranking. Moreover, in at least one embodiment, the method 800 includes an act of, in response to navigating to the highlight message associated with the selected highlight excerpt: removing the selected highlight excerpt from the horizontally scrollable display, and providing the horizontally scrollable display below the highlight message corresponding to the selected highlight excerpt within the graphical user interface for the group messaging thread.

Figure 9:
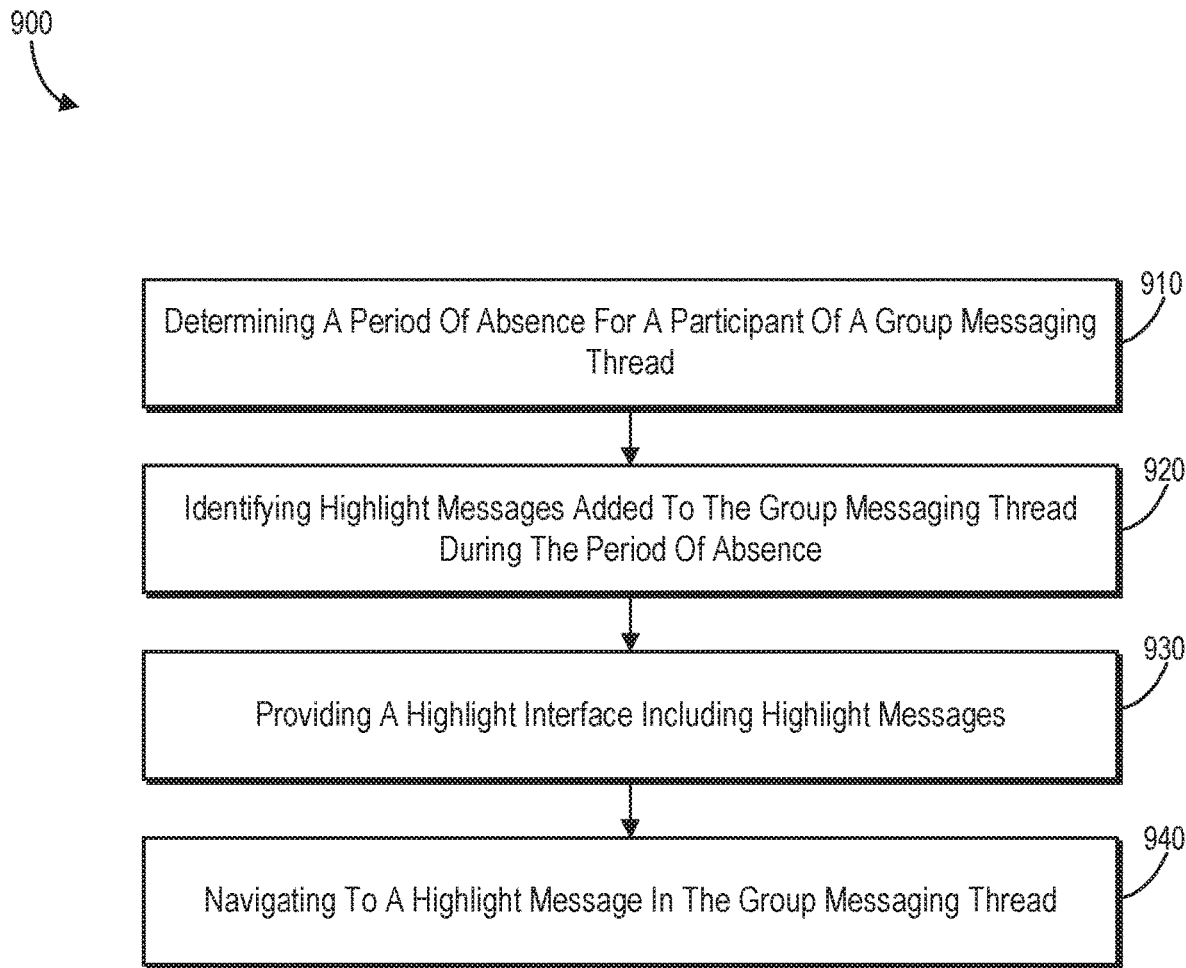
FIG. 9 illustrates a flowchart of a series of acts in a method of providing one or more highlight messages in a group messaging thread in accordance with one or more embodiments.

FIG. 9 illustrates a flowchart of one example method 900 of providing identified highlight messages to a group messaging thread participant. The method 900 includes an act 910 of determining a period of absence for a participant of a group messaging thread. In particular, the act 910 can involve determining, for a group messaging thread comprising a plurality of participants, a period of time corresponding to a participant's absence from a group messaging thread.

The method 900 also includes an act 920 of identifying highlight messages added to the group messaging thread during the period of absence. In particular, the act 920 can involve identifying one or more highlight messages from messages added to the group messaging thread during the determined period of time corresponding to the participant's absence from the group messaging thread. For example, in one or more embodiments, identifying one or more highlight messages includes: calculating a score for each of the plurality of electronic messages corresponding to the participant's absence from the group messaging thread, and determining electronic messages with a calculated score higher than a threshold score are highlight messages. In at least one embodiment, calculating the score for each of the plurality of electronic messages is based on one or more of a digital media item in each electronic message, a question within each electronic message, a hyperlink within each electronic message, event information within each electronic message, a mention of the participant within each electronic message, message activity surrounding each electronic message, or a networking system coefficient between the participant and a sender of each electronic message.

Furthermore, the method 900 includes an act 930 of providing a highlight interface including highlight messages. In particular, the act 930 can involve, in response to the participant selecting a highlight control associated with the one or more highlight messages displayed within a graphical user interface including the group messaging thread, providing a highlight message interface including the one or more highlight messages. For example, in one or more embodiments, providing the highlight interface including one or more highlight messages includes, for each of the identified highlight message displayed within the graphical user interface including the group messaging thread, generating an associated highlight message based on one or more of a media item from the highlight message displayed within the graphical user interface, text from the highlight message displayed within the graphical user interface, or a hyperlink from the highlight message displayed within the graphical user interface. In at least one embodiment, generating an associated highlight message further includes: identifying a group messaging thread identifier associated with the highlight message displayed within the graphical user interface, and associating the identified group messaging thread identifier with the associated highlight message.

The method 900 further includes an act 940 of navigating to a highlight message in the group messaging thread. In particular, the act 940 can involve, in response to a detected selection of a highlight message within the highlight interface, navigating, within the graphical user interface for the group messaging thread, to the selected highlight message. For example, in one or more embodiments, navigating to the highlight message associated with the selected highlight message from the highlight message interface comprises navigating, within the graphical user interface for the group messaging thread, to the group messaging thread identifier associated with the selected highlight message from the highlight message interface. In at least one embodiment, the method 900 further includes, in response to navigating to the highlight message in the group messaging thread associated with the selected highlight message from the highlight message interface, removing the selected highlight message from the highlight message interface.

In one or more embodiments, the method 900 can include an act of ranking the one or more highlight messages in the highlight message interface based on one or more of the scores associated with the one or more highlight messages from the group messaging thread, social networking system information associated with the participant, or electronic messaging system information associated with the participant. The method 900 can also include an act of positioning the one or more highlight messages in the highlight message interface based on the ranking.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
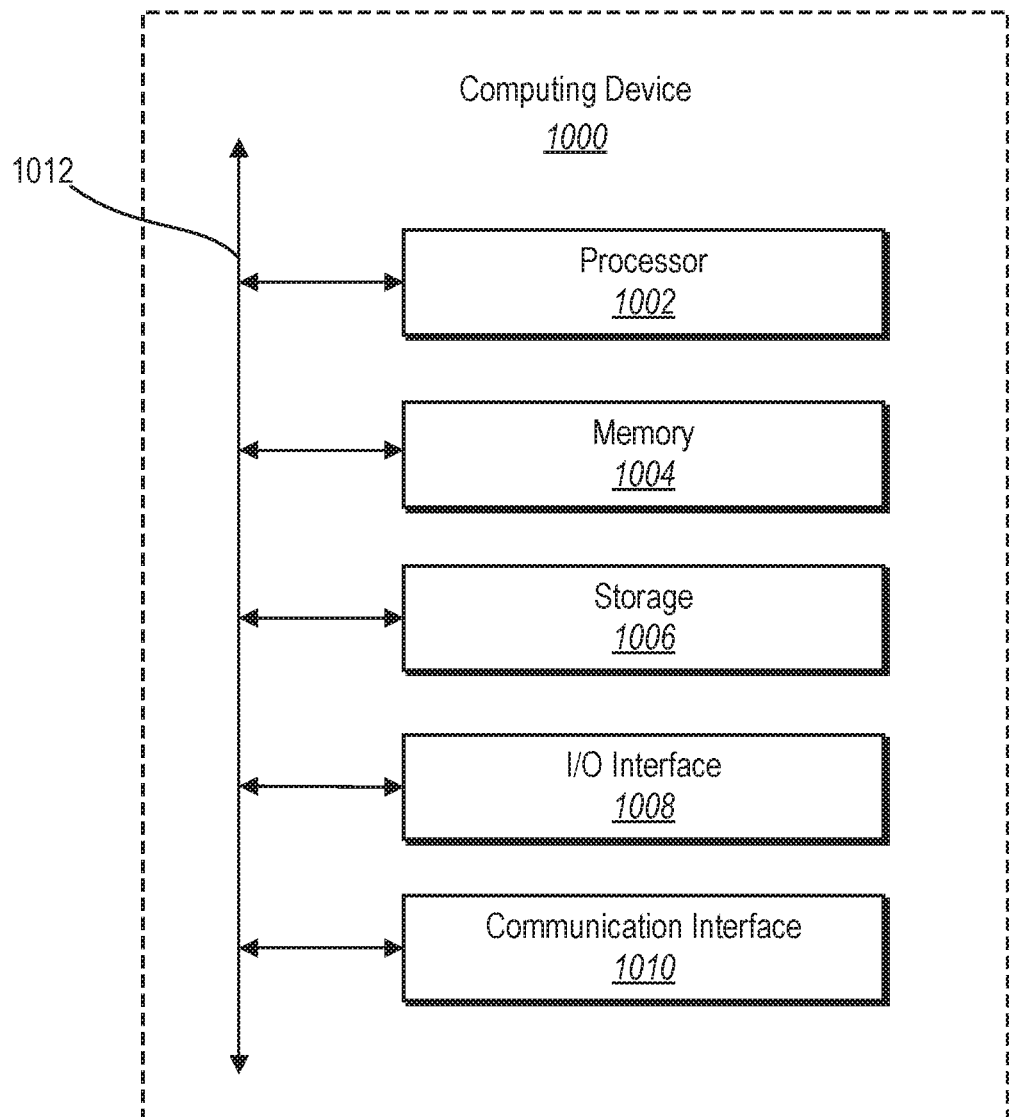
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the electronic communication system 100. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage device 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the electronic communication system 100 can comprise a social networking system (e.g., the social networking system 110 as described with reference to FIG. 1). In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 11:
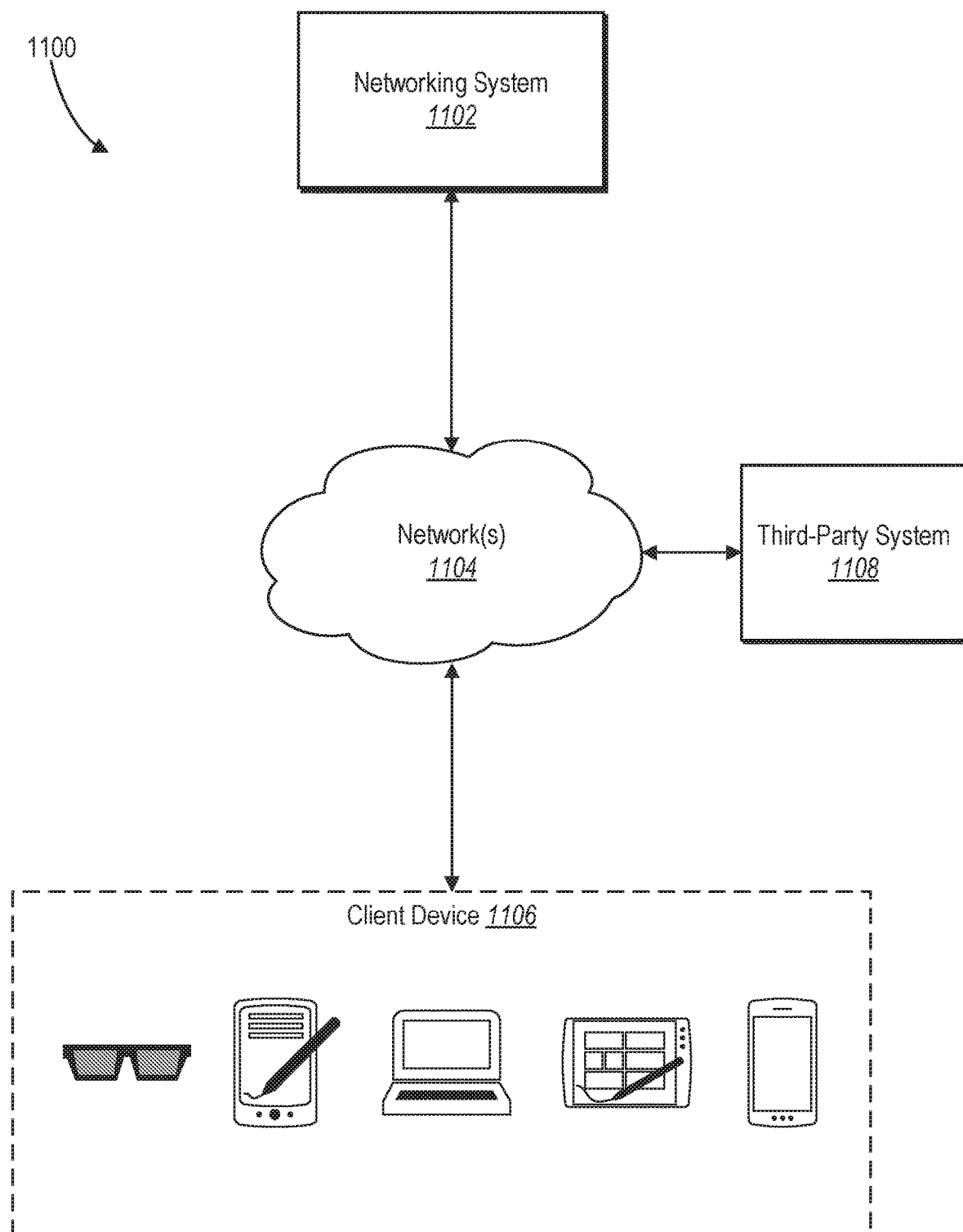
FIG. 11 illustrates an example network environment of a networking system in accordance with one or more embodiments.

FIG. 11 illustrates an example network environment 1100 of a social networking system. Network environment 1100 includes a client device 1106, a networking system 1102 (e.g., a social networking system and/or an electronic messaging system), and a third-party system 1108 connected to each other by a network 1104. Although FIG. 11 illustrates a particular arrangement of client device 1106, networking system 1102, third-party system 1108, and network 1104, this disclosure contemplates any suitable arrangement of client device 1106, networking system 1102, third-party system 1108, and network 1104. As an example and not by way of limitation, two or more of client device 1106, networking system 1102, and third-party system 1108 may be connected to each other directly, bypassing network 1104. As another example, two or more of client device 1106, networking system 1102, and third-party system 1108 may be physically or logically co-located with each other in whole or in part. Moreover, although FIG. 11 illustrates a particular number of client devices 1106, networking systems 1102, third-party systems 1108, and networks 1104, this disclosure contemplates any suitable number of client devices 1106, networking systems 1102, third-party systems 1108, and networks 1104. As an example and not by way of limitation, network environment 1100 may include multiple client device 1106, networking systems 1102, third-party systems 1108, and networks 1104.

This disclosure contemplates any suitable network 1104. As an example and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client device 1106, networking system 1102, and third-party system 1108 to communication network 1104 or to each other. This disclosure contemplates any suitable links. In particular embodiments, one or more links include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example and not by way of limitation, a client device 1106 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1106. A client device 1106 may enable a network user at client device 1106 to access network 1104. A client device 1106 may enable its user to communicate with other users at other client devices 1106.

In particular embodiments, client device 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1106 may enter a Uniform Resource Locator (URL) or other address directing the web browser to a particular server (such as server, or a server associated with a third-party system 1108), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. Client device 1106 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1102 may be a network-addressable computing system that can host an online social network. Networking system 1102 may generate, store, receive, and send social-networking data, such as, for example, user-profile data, concept-profile data, social-graph information, or other suitable data related to the online social network. Networking system 1102 may be accessed by the other components of network environment 1100 either directly or via network 1104. In particular embodiments, networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, a networking system 1102, or a third-party system 1108 to manage, retrieve, modify, add, or delete, the information stored in data store.

In particular embodiments, networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1102 may provide users of the online social network the ability to communicate and interact with other users. In particular embodiments, users may join the online social network via networking system 1102 and then add connections (e.g., relationships) to a number of other users of networking system 1102 that they want to be connected to. Herein, the term "friend" may refer to any other user of networking system 1102 with whom a user has formed a connection, association, or relationship via networking system 1102.

In particular embodiments, networking system 1102 may provide users with the ability to take actions on various types of items or objects, supported by networking system 1102. As an example and not by way of limitation, the items and objects may include groups or social networks to which users of networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1102 or by an external system of third-party system 1108, which is separate from networking system 1102 and coupled to networking system 1102 via a network 1104.

In particular embodiments, networking system 1102 may be capable of linking a variety of entities. As an example and not by way of limitation, networking system 1102 may enable users to interact with each other as well as receive content from third-party systems 1108 or other entities, or to allow users to interact with these entities through an application programming interfaces (API) or other communication channels.

In particular embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from an entity operating networking system 1102. In particular embodiments, however, networking system 1102 and third-party systems 1108 may operate in conjunction with each other to provide social-networking services to users of networking system 1102 or third-party systems 1108. In this sense, networking system 1102 may provide a platform, or backbone, which other systems, such as third-party systems 1108, may use to provide social-networking services and functionality to users across the Internet.

In particular embodiments, a third-party system 1108 may include a third-party content object provider. A third-party content object provider may include one or more sources of content objects, which may be communicated to a client device 1106. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1102 also includes user-generated content objects, which may enhance a user's interactions with networking system 1102. User-generated content may include anything a user can add, upload, send, or "post" to networking system 1102. As an example and not by way of limitation, a user communicates posts to networking system 1102 from a client device 1106. Posts may include data such as status updates or other textual data, location information, photos, videos, links, music or other similar data or media. Content may also be added to networking system 1102 by a third-party through a "communication channel," such as a newsfeed or stream.

In particular embodiments, networking system 1102 may include a variety of servers, sub-systems, programs, modules, logs, and data stores. In particular embodiments, networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1102 may also include suitable components such as network interfaces, security mechanisms, load balancers, failover servers, management-and-network-operations consoles, other suitable components, or any suitable combination thereof. In particular embodiments, networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1102 to one or more client devices 1106 or one or more third-party system 1108 via network 1104. The web server may include a mail server or other messaging functionality for receiving and routing messages between networking system 1102 and one or more client devices 1106. An API-request server may allow a third-party system 1108 to access information from networking system 1102 by calling one or more APIs. An action logger may be used to receive communications from a web server about a user's actions on or off networking system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of networking system 1102. A privacy setting of a user determines how particular information associated with a user can be shared. The authorization server may allow users to opt in to or opt out of having their actions logged by networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client devices 1106 associated with users. Advertisement-pricing modules may combine social information, the current time, location information, or other suitable information to provide relevant advertisements, in the form of notifications, to a user.

Figure 12:
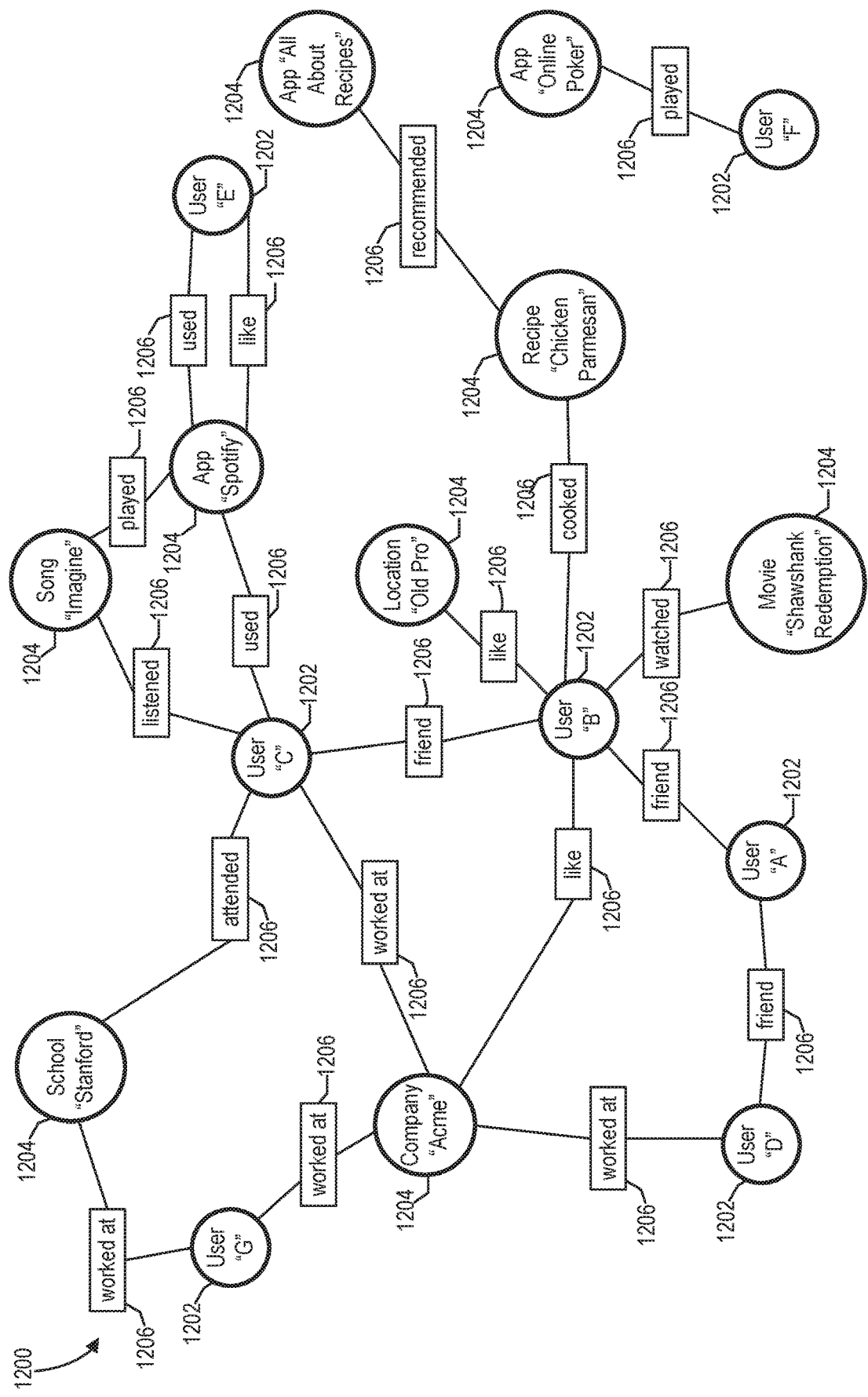
FIG. 12 illustrates a social graph in accordance with one or more embodiments.

FIG. 12 illustrates example social graph 1200. In particular embodiments, networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of networking system 1102. As an example and not by way of limitation, a user may be an individual (human user), an entity (e.g., an enterprise, business, or third-party application), or a group (e.g., of individuals or entities) that interacts or communicates with or over networking system 1102. In particular embodiments, when a user registers for an account with networking system 1102, networking system 1102 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with networking system 1102. In particular embodiments, a user node 1202 may be associated with information provided by a user or information gathered by various systems, including networking system 1102. As an example and not by way of limitation, a user may provide his or her name, profile picture, contact information, birth date, sex, marital status, family status, employment, education background, preferences, interests, or other demographic information. In particular embodiments, a user node 1202 may be associated with one or more data objects corresponding to information associated with a user. In particular embodiments, a user node 1202 may correspond to one or more webpages.

In particular embodiments, a concept node 1204 may correspond to a concept. As an example and not by way of limitation, a concept may correspond to a place (such as, for example, a movie theater, restaurant, landmark, or city); a website (such as, for example, a website associated with networking system 1102 or a third-party website associated with a web-application server); an entity (such as, for example, a person, business, group, sports team, or celebrity); a resource (such as, for example, an audio file, video file, digital photo, text file, structured document, or application) which may be located within networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to networking system 1102. Profile pages may also be hosted on third-party websites associated with a third-party system 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1106 to send to networking system 1102 a message indicating the user's action. In response to the message, networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, networking system 1102 may send a "friend request" to the second user. If the second user confirms the "friend request," networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept node 1204 by clicking or selecting a "Like" icon, which may cause the user's client device 1106 to send to networking system 1102 a message indicating the user's liking of the concept associated with the concept-profile page. In response to the message, networking system 1102 may create an edge 1206 between user node 1202 associated with the user and concept node 1204, as illustrated by "like" edge 1206 between the user and concept node 1204. In particular embodiments, networking system 1102 may store an edge 1206 in one or more data stores. In particular embodiments, an edge 1206 may be automatically formed by networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1102) or RSVP (e.g., through networking system 1102) to an event associated with the advertisement. In addition or as an alternative, an advertisement may include social-networking-system context directed to the user. As an example and not by way of limitation, an advertisement may display information about a friend of the user within networking system 1102 who has taken an action associated with the subject matter of the advertisement.

In particular embodiments, networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1102 may measure or quantify social-graph affinity using an affinity coefficient (which may be referred to herein as "coefficient")

. The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1102 may calculate a coefficient based on a user's actions. Networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Networking system 1102 may analyze a user's actions to determine whether one or more of the actions indicate an affinity for subject matter, content, other users, and so forth. As an example and not by way of limitation, if a user may make frequently posts content related to "coffee" or variants thereof, networking system 1102 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1102 may calculate a coefficient based on the type of relationship between particular objects. Referencing the social graph 1200, networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than a user node 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1102 may determine that the user has a higher coefficient with respect to the first photo than the second photo because having a tagged-in-type relationship with content may be assigned a higher weight and/or rating than having a like-type relationship with content. In particular embodiments, networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1102 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1106 of the user). A first user may be more interested in other users or concepts that are closer to the first user. As an example and not by way of limitation, if a user is one mile from an airport and two miles from a gas station, networking system 1102 may determine that the user has a higher coefficient for the airport than the gas station based on the proximity of the airport to the user.

In particular embodiments, networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1102 may provide information that is relevant to user's interests and current circumstances, increasing the likelihood that they will find such information of interest. In particular embodiments, networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, networking system 1102 may calculate the coefficient (or access the coefficient information if it has previously been calculated and stored). In particular embodiments, networking system 1102 may measure an affinity with respect to a particular process. Different processes (both internal and external to the online social network) may request a coefficient for a particular object or set of objects. Networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A non-transitory computer-readable medium storing instructions thereon that, when executed by at least one processor, cause a computer system to:
   determine, for a group messaging thread comprising a plurality of participants, a period of time corresponding to a participant's absence from the group messaging thread;
   identify one or more highlight messages from messages added to the group messaging thread during the determined period of time corresponding to the participant's absence from the group messaging thread;
   in response to the participant accessing the group messaging thread after the participant's absence from the group messaging thread, provide a selectable display element overlaid on top of a group messaging thread window that includes the group messaging thread, wherein:
      the selectable display element comprises a grouping of navigation shortcut buttons respectively associated with categories of highlight messages for navigating to the one or more highlight messages within the group messaging thread window,
      the selectable display element is overlaid on top of the group messaging thread window at a position adjacent to a participant's last-read electronic message in the group messaging thread, and
      the navigation shortcut buttons respectively indicate the categories of highlight messages and a number of the one or more highlight messages that correspond to a category of highlight messages; and
   in response to a detected selection of a first navigation shortcut button of the selectable display element representing a first category of highlight messages, navigate within the group messaging thread to a display position in the group messaging thread window corresponding to a first highlight message of the one or more highlight messages within the first category of highlight messages.

2. The non-transitory computer-readable medium as recited in claim 1, wherein identifying one or more highlight messages comprises:
   calculating a score for each of a plurality of electronic messages corresponding to the participant's absence from the group messaging thread; and
   determining electronic messages with a calculated score higher than a threshold score are highlight messages.

3. The non-transitory computer-readable medium as recited in claim 2, wherein calculating the score for each of the plurality of electronic messages is based on one or more of a digital media item in each electronic message, a question within each electronic message, a hyperlink within each electronic message, event information within each electronic message, a mention of the participant within each electronic message, message activity surrounding each electronic message, or a networking system coefficient between the participant and a sender of each electronic message.

4. The non-transitory computer-readable medium as recited in claim 1, wherein navigating within the group messaging thread to the display position in the group messaging thread window corresponding to the first highlight message of the one or more highlight messages within the first category of highlight messages comprises:
   identifying a group message thread identifier associated with the first highlight message of the one or more highlight messages within the first category of highlight messages; and
   navigating within the group messaging thread to a display position in the group messaging thread window corresponding to the identified group message thread identifier.

5. The non-transitory computer-readable medium as recited in claim 1, further including instructions that, when executed by at least one processor, cause a computer system to, in response to navigating within the group messaging thread to the display position in the group messaging thread window corresponding to the first highlight message, reposition the selectable display element overlaid on top of the group messaging thread window to a position adjacent to the first highlight message of the group messaging thread.

6. The non-transitory computer-readable medium as recited in claim 1, further including instructions that, when executed by at least one processor, cause a computer system to, after detecting the selection of the first navigation shortcut button of the selectable display element and navigating within the group messaging thread to the display position in the group messaging thread window corresponding to the first highlight message of the one or more highlight messages within the first category of highlight messages:
   detect a second selection of the first navigation shortcut button of the selectable display element representing the first category of highlight messages; and
   navigate within the group messaging thread to a display position in the group messaging thread window corresponding to a second highlight message of the one or more highlight messages within the first category of highlight messages.

7. The non-transitory computer-readable medium as recited in claim 1, further including instructions that, when executed by at least one processor, cause a computer system to:
   rank the identified one or more highlight messages, wherein ranking the identified one or more highlight messages is based on one or more scores associated with the one or more highlight messages, social networking system information associated with the participant, or electronic messaging system information associated with the participant; and
   wherein navigating within the group messaging thread to the display position in the group messaging thread window corresponding to the first highlight message of the one or more highlight messages within the first category of highlight messages comprises navigating within the group messaging thread to a display position in the group messaging thread window corresponding to a highest ranked highlight message within the first category of highlight messages.

8. The non-transitory computer-readable medium as recited in claim 1, wherein a category of highlight messages comprises at least one of a digital media category, a hyperlink category, a recording category, an event category, a mention category, or an interest category.

9. A system comprising:
   at least one processor; and
   at least one non-transitory computer-readable storage medium storing instructions thereon that, when executed by the at least one processor, cause the system to:
   determine, for a group messaging thread comprising a plurality of participants, a period of time corresponding to a participant's absence from the group messaging thread;
   identify one or more highlight messages added to the group messaging thread during the determined period of time corresponding to the participant's absence from the group messaging thread;
   in response to the participant accessing the group messaging thread after the participant's absence from the group messaging thread, provide a selectable display element overlaid on top of a group messaging thread window that includes the group messaging thread, wherein:
      the selectable display element comprises a grouping of navigation shortcut buttons respectively associated with categories of highlight messages for navigating to the one or more highlight messages within the group messaging thread window,
      the selectable display element is overlaid on top of the group messaging thread window at a position adjacent to a participant's last-read electronic message in the group messaging thread, and
      the navigation shortcut buttons respectively indicate the categories of highlight messages and a number of the one or more highlight messages that correspond to a category of highlight messages; and
   in response to a detected selection of a first navigation shortcut button of the selectable display element representing a first category of highlight messages, navigate within the group messaging thread to a display position in the group messaging thread window corresponding to a first highlight message of the one or more highlight messages within the first category of highlight messages.

10. The system as recited in claim 9, wherein identifying one or more highlight messages comprises:
   calculating a score for each of a plurality of electronic messages corresponding to the participant's absence from the group messaging thread; and
   determining electronic messages with a calculated score higher than a threshold score are highlight messages.

11. The system as recited in claim 10, wherein calculating the score for each of the plurality of electronic messages is based on one or more of a digital media item in each electronic message, a question within each electronic message, a hyperlink within each electronic message, event information within each electronic message, a mention of the participant within each electronic message, message activity surrounding each electronic message, or a networking system coefficient between the participant and a sender of each electronic message.

12. The system as recited in claim 11, wherein navigating within the group messaging thread to the display position in the group messaging thread window corresponding to the first highlight message of the one or more highlight messages within the first category of highlight messages comprises:
   identifying a group message thread identifier associated with the first highlight message of the one or more highlight messages within the first category of highlight messages; and
   navigating within the group messaging thread to display position in the group messaging thread window corresponding to the identified group message thread identifier.

13. The system as recited in claim 12, further comprising instructions that, when executed by the at least one processor, cause the system to, in response to navigating within the group messaging thread to the display position in the group messaging thread window corresponding to the first highlight message, reposition the selectable display element overlaid on top of the group messaging thread window to a position adjacent to the first highlight message of the group messaging thread.

14. The system as recited in claim 13, further comprising instructions that, when executed by the at least one processor, cause the system to, after detecting the selection of the first navigation shortcut button of the selectable display element and navigating within the group messaging thread to the display position in the group messaging thread window corresponding to the first highlight message of the one or more highlight messages within the first category of highlight messages:
- detect a second selection of the first navigation shortcut button of the selectable display element representing the first category of highlight messages; and
- navigate within the group messaging thread to a display position in the group messaging thread window corresponding to a second highlight message of the one or more highlight messages within the first category of highlight messages.

15. The system as recited in claim 14, further comprising instructions that, when executed by the at least one processor, cause the system to:
- rank the identified one or more highlight messages, wherein ranking the identified one or more highlight messages is based on one or more scores associated with the one or more highlight messages, social networking system information associated with the participant, or electronic messaging system information associated with the participant; and
- wherein navigating within the group messaging thread to the display position in the group messaging thread window corresponding to the first highlight message of the one or more highlight messages within the first category of highlight messages comprises navigating within the group messaging thread to a display position in the group messaging thread window corresponding to a highest ranked highlight message within the first category of highlight messages.

16. The system as recited in claim 9, wherein a category of highlight messages comprises at least one of a digital media category, a hyperlink category, a recording category, an event category, a mention category, or an interest category.

17. A method comprising:
- determining, for a group messaging thread comprising a plurality of participants, a period of time corresponding to a participant's absence from the group messaging thread;
- identifying one or more highlight messages added to the group messaging thread during the determined period of time corresponding to the participant's absence from the group messaging thread;
- in response to the participant accessing the group messaging thread after the participant's absence from the group messaging thread, providing a selectable display element overlaid on top of a group messaging thread window that includes the group messaging thread, wherein:
  - the selectable display element comprises a grouping of navigation shortcut buttons respectively associated with categories of highlight messages for navigating to the one or more highlight messages within the group messaging thread window,
  - the selectable display element is overlaid on top of the group messaging thread window at a position adjacent to a participant's last-read electronic message in the group messaging thread, and
  - the navigation shortcut buttons respectively indicate the categories of highlight messages and a number of the one or more highlight messages that correspond to a category of highlight messages; and
- in response to a detected selection of a first navigation shortcut button of the selectable display element representing a first category of highlight messages, navigating within the group messaging thread to a display position in the group messaging thread window corresponding to a first highlight message of the one or more highlight messages within the first category of highlight messages.

18. The method as recited in claim 17, wherein navigating within the group messaging thread to the display position in the group messaging thread window corresponding to the first highlight message of the one or more highlight messages within the first category of highlight messages comprises:
- identifying a group message thread identifier associated with the first highlight message of the one or more highlight messages within the first category of highlight messages; and
- navigating within the group messaging thread to a display position in the group messaging thread window corresponding to the identified group message thread identifier.

19. The method as recited in claim 18, further comprising, after detecting the selection of the first navigation shortcut button of the selectable display element and navigating to the first highlight message of the one or more highlight messages within the first category of highlight messages:
- detecting a second selection of the first navigation shortcut button of the selectable display element representing the first category of highlight messages; and
- navigating within the group messaging thread to a display position in the group messaging thread window corresponding to a second highlight message of the one or more highlight messages within the first category of highlight messages.

20. The method as recited in claim 17, wherein a category of highlight messages comprises at least one of a digital media category, a hyperlink category, a recording category, an event category, a mention category, or an interest category.

* * * * *